| (12) | United States Patent<br>Kelishadi | (10) Patent No.: US 10,834,072 B2<br>(45) Date of Patent: Nov. 10, 2020 |
|---|---|---|

(54) DYNAMIC, CUSTOMIZABLE, CONTROLLED-ACCESS CHILD OUTCOME PLANNING AND ADMINISTRATION RESOURCE

(71) Applicant: Nulinx Intl., Inc., Tarzana, CA (US)

(72) Inventor: Hamid Kelishadi, Calabasas, CA (US)

( * ) Notice: Subject to any disclaimer, the term of this patent is extended or adjusted under 35 U.S.C. 154(b) by 117 days.

(21) Appl. No.: 14/685,577

(22) Filed: Apr. 13, 2015

(65) Prior Publication Data

US 2015/0295914 A1    Oct. 15, 2015

Related U.S. Application Data

(60) Provisional application No. 61/978,692, filed on Apr. 11, 2014.

(51) Int. Cl.
*G06F 3/0484* (2013.01)
*G06Q 50/26* (2012.01)
(Continued)

(52) U.S. Cl.
CPC .......... *H04L 63/083* (2013.01); *G06F 3/0482* (2013.01); *G06F 3/0484* (2013.01);
(Continued)

(58) Field of Classification Search
CPC ... H04L 63/083; H04L 67/306; H04L 63/105; G06F 3/0482; G06F 3/0484; G06F 21/31; G06Q 50/26
See application file for complete search history.

(56) References Cited

U.S. PATENT DOCUMENTS 6,327,628 B1 *  12/2001  Anuff ................ G06F 17/30873
                                                         707/999.009
7,475,419 B1     1/2009   Basu et al.
(Continued)

OTHER PUBLICATIONS

Vishal M. Toshniwal et al, Virtualized Screen: A Third Element for Cloud-Mobile Convergence, International Journal of Advanced Research in Computer Science & Technology (IJARCST 2014), Apr.-Jun. 2014, 164-166, vol. 2, Issue 2, Ver. 1, IJARCST.

*Primary Examiner* — Jennifer N To
*Assistant Examiner* — Ashley M Fortino
(74) *Attorney, Agent, or Firm* — Makoui Law, PC; Ali Makoui

(57) ABSTRACT

A cloud-based access to child care planning and outcome resource is described. The resource allows multiple end-users to access content related to child care. Such content includes reports, table, graphs, multimedia, lists, forms, reminders, and/or other appropriate elements. The content may be presented via one or more graphical user interfaces (GUIs). Each such GUI may include various input elements such as tabs, buttons, icons, etc. and various content elements such as portlets, or frames, etc. Each GUI may be customized for a particular end-user and/or a particular group of end-users. In this way, an administrator or super-user may generate multiple GUIs, where each is associated with a user group (e.g., parents, teachers, administrators, etc.). In addition, each end-user may be able to customize the GUIs available to the end user. Such customization may include selection of input and/or content elements, layout of elements, graphical features, and/or other appropriate customizations.

17 Claims, 22 Drawing Sheets

(51) Int. Cl.
  *G06F 3/0482* (2013.01)
  *H04L 29/06* (2006.01)
  *H04L 29/08* (2006.01)
  *G06F 21/31* (2013.01)

(52) U.S. Cl.
  CPC ............ *G06F 21/31* (2013.01); *G06Q 50/26* (2013.01); *H04L 67/306* (2013.01); *H04L 63/105* (2013.01)

(56) References Cited

U.S. PATENT DOCUMENTS

| | | |
|---|---|---|
| 8,589,481 B2 | 11/2013 | Das et al. |
| 8,655,390 B2 | 2/2014 | Karmarkar et al. |
| 2006/0053384 A1 | 3/2006 | La Fetra, Jr. et al. |
| 2007/0118813 A1* | 5/2007 | Forstall ................ G06F 3/0486 715/805 |
| 2009/0240522 A1* | 9/2009 | Handal ............... G06F 19/3418 705/2 |
| 2011/0184993 A1 | 7/2011 | Chawla et al. |
| 2011/0231280 A1 | 9/2011 | Farah |
| 2011/0295986 A1 | 12/2011 | Ferris et al. |
| 2013/0018939 A1 | 1/2013 | Chawla et al. |
| 2013/0111380 A1 | 5/2013 | Parker et al. |
| 2013/0227384 A1* | 8/2013 | Good ..................... H04L 67/10 715/205 |
| 2014/0096208 A1 | 4/2014 | Buck |

\* cited by examiner

600

Customize Dashboard Pages — 610

Portal Page Name: DName 1

[All Users ▼] [All Access Types ▼] [Filter] [View All]

[Add New Page] [Exit to Dashboard]

| # | Dashboard Page Name | Info | View | Edit | Copy | Action |
|---|---|---|---|---|---|---|
| 1 | Pagename 1 | Info | None | None | None | C, A, D |
| 2 | Pagename 2 | Info | Group | None | None | C, A, D |

Modify Dashboard Page — 710

Dashboard Name: DName 1

Number of Columns: [3 ▼]  Layout: [33%-33%-33% ▼]

| Column 1 | Column 2 | Column 3 |
|---|---|---|
| Search: [ ] | Search: [ ] | Search: [ ] |
| Group 1<br>Item 1-1<br>Item 1-2 | Group 1<br>Item 1-1<br>Item 1-2 | Group 1<br>Item 1-1<br>Item 1-2 |
| ⬇⬆ — 720 | ⬇⬆ | ⬇⬆ |
| Item 2-1 | Item 1-2 | Item 3-1 |

730 — [Save/Change Dashboard Page Settings]

Customize Access

| View Access Type: | Access to Selected Groups ▼ | Group 4 / Group 5 / Group 6 / Group 7 |
|---|---|---|
| Edit Access Type: | No Access ▼ | |
| Copy Access Type: | Access to Selected Users ▼ | User 1 / User 2 / User 3 / User 4 |

Save/Change Access Settings

Dashboard | Support | Help

Tab 1 | Tab 2 | ... | Tab N

Dashboard | Support | Help

Tab 1 | Tab 2 | ... | Tab N

Customize Dashboard Pages

Portal Page Name: Name 1

All Users ▼ | All Access Types ▼ | Filter | View All

Add New Page | Exit to Dashboard

| # | Dashboard Page Name | Info | View | Edit | Copy | Action |
|---|---|---|---|---|---|---|
| 1 | DName 1 | Info | User | None | Group | C, A, D |
| 2 | Pagename 1 | Info | Group | None | None | C, A, D |
| 3 | Pagename 2 | Info | None | None | None | C, A, D |

○ | Dashboard | Support | Help | (X)
Tab 1 | Tab 2 | ... | Tab N

⌂ DName 1 ▼ ☆ ⓘ 🗐                                  Ⓢ Ⓟ

Report Group 1                           (X)
PName 1

Current Enrollees ▼ | Age ▼ | View All
All Agencies ▼ | All Sites ▼
Display Type: Bar Chart ▼  Initial Display: Expanded ▼
Portlet Name: PName 1
Portlet Notes: [            ]
☐ Do Not Display on Other Users' "Personalize Dashboard Page"

Save/Change Portlet Settings

○ | Dashboard | Support | Help | (X)
Tab 1 | Tab 2 | ... | Tab N

⌂ DName 1 ▼ ☆ ⓘ                                    Ⓢ Ⓟ

PName 1                                (X)
Heading Font Color: #000000  Heading Background Color: #BFC484  Default Content Editor Save/Change Portlet Settings

FIG. 15

DYNAMIC, CUSTOMIZABLE, CONTROLLED-ACCESS CHILD OUTCOME PLANNING AND ADMINISTRATION RESOURCE

CROSS-REFERENCE TO RELATED APPLICATIONS

This application claims priority to U.S. Provisional Patent Application Ser. No. 61/978,692, filed on Apr. 11, 2014.

BACKGROUND

Many participants in early childhood, education, child care, human services and community service providers (e.g., students, parents, teachers, caregivers, social workers, managing and government bodies, government agencies, etc.) may wish to evaluate data associated with various resources (e.g., children, families, staff, volunteers, centers, regional data, government forms and reports, etc.). Such data may typically be associated with many disparate sources that are not able to be easily found, compiled, and/or evaluated by users.

In addition, data that is available may not be provided in an appropriate format for each type of user. For instance, parents may want different information than an administrator or teacher. Furthermore, administrators or other users may wish to designate various security permissions to various different users or groups of users.

Thus there is the need for a dynamic, customizable, controlled-access child outcome planning and administration resource.

SUMMARY

Some embodiments provide a resource that allows participants in early childhood, education, child care, human services and community service providers, planning, and administration to receive, evaluate, and/or manipulate data associated with various resources. Such data may be collected from various appropriate resources (e.g., children, families, staff, volunteers, centers, regional data, government forms and reports, etc.).

In some embodiments, participants may be designated as different user types or groups (e.g., administrator-user, teacher-user, social worker-user, parent-user, etc.). Some embodiments may provide information and/or interfaces based on user identity and/or user type. In this way, each user may receive appropriate information.

A user may be able to define various content elements and/or interfaces and then associate those elements with different sets of users (or all users) where the users may be grouped into sets depending on type, selection by the administrator, association with a region or entity, etc. The interfaces may include pages or "dashboards" that allow a user to create content elements and/or interfaces and/or to customize the content and appearance of the elements, pages, and/or interfaces. Different users (or user types) may have different permission levels (or privileges) to create and/or customize the various elements.

The content elements may include various types of content or data presentation (e.g., lists, reports, forms, tables, graphs, etc.). The content elements may be able to be customized by each end user. Each end-user may specify features related to appearance, layout, etc. In addition, some embodiments may allow end-users to filter data included in a content element. Such filtering may be applied dynamically and/or saved and applied to a content element at any future access.

The preceding Brief Summary is intended to serve as a brief introduction to various features of some exemplary embodiments. Other embodiments may be implemented in other specific forms without departing from the spirit of the disclosure.

BRIEF DESCRIPTION OF THE SEVERAL VIEWS OF THE DRAWINGS

The novel features of the disclosure are set forth in the appended claims. However, for purpose of explanation, several embodiments are illustrated in the following drawings.

FIGS. 6-9 illustrate exemplary graphical user interfaces used to define or customize a dashboard of some embodiments;

FIGS. 12-15 illustrate exemplary graphical user interfaces used to define or customize a portlet of some embodiments;

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the invention is best defined by the appended claims.

Various inventive features are described below that can each be used independently of one another or in combination with other features. Broadly, some embodiments generally provide an online resource that allows dynamic, customizable, controlled-access child outcome planning and administration.

A first exemplary embodiment provides an automated method of providing cloud-based access to child care planning and outcome resources. The method includes: authenticating a user; determining a user type associated with the user; providing a graphical user interface (GUI) based at least partly on the user type or user-specific permission level which may differ even among users of the same type; and updating the GUI based at least partly on commands received from the user.

A second exemplary embodiment provides a GUI able to facilitate child outcome planning and administration. The GUI includes: a set of input elements; and a set of content elements, each content element having at least one input element and at least one content item, where inclusion of elements in the set of input elements and inclusion of elements in the set of content elements is based at least partly on a user identity.

A third exemplary embodiment provides a system that provides cloud-based access to child care planning and outcome resources. The system includes: multiple data sources; at least one data processing module able to: retrieve and process data from the data sources; generate a user interface (UI) based at least partly on the retrieved and processed data; and provide access to the UI via at least one network; and a configuration module able to store and supply configuration data that at least partly controls the operations of the data processing module.

Several more detailed embodiments are described in the sections below. Section I provides a description of exemplary systems provided by some embodiments. Section II then describes user interfaces provided by some embodiments. Next, Section III describes various methods of operation used by some embodiments. Lastly, Section IV describes a computer system which is used to implement some embodiments.

I. System Architecture

A. System Overview

Figure 1:
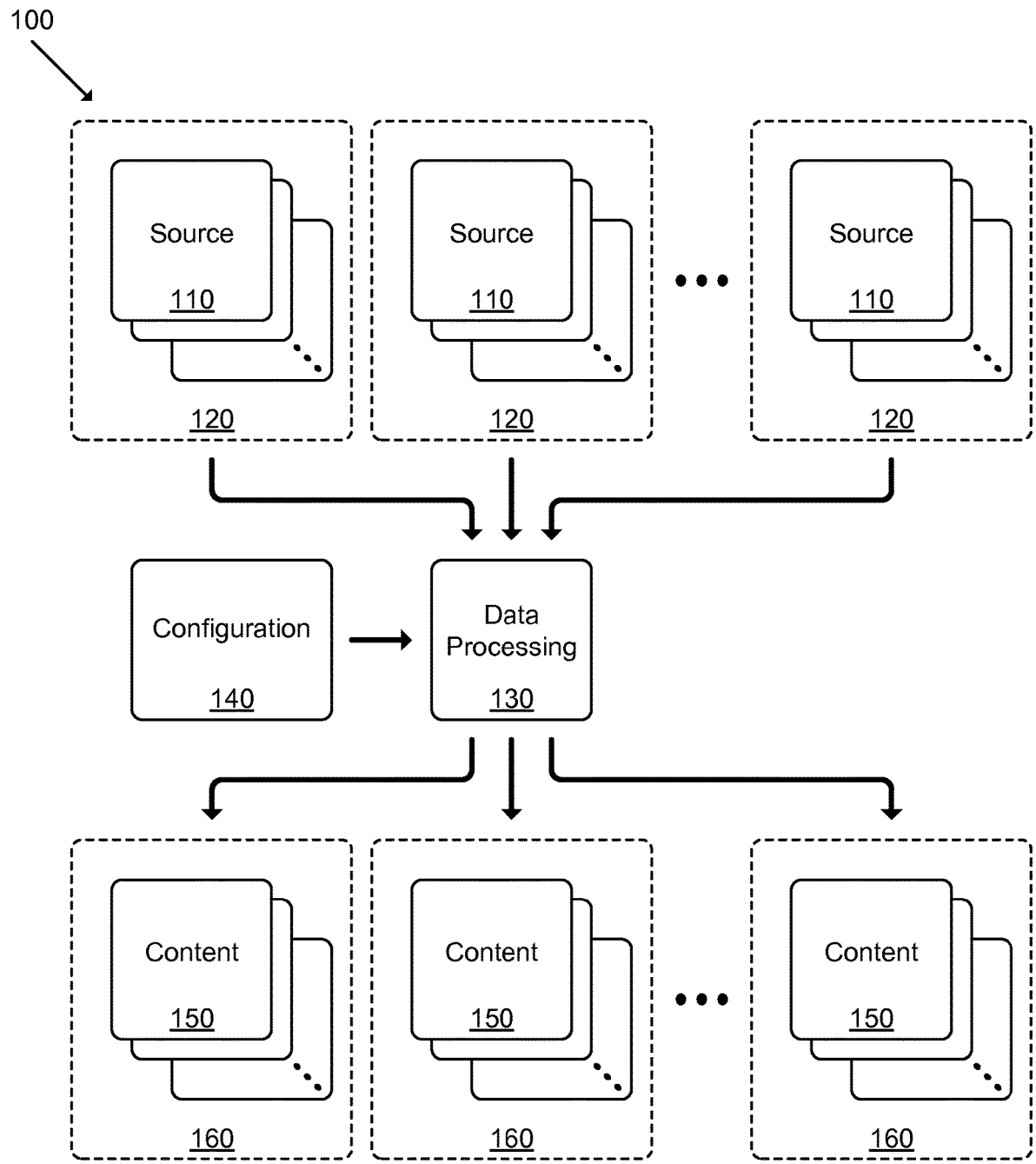
FIG. 1 illustrates a schematic block diagram of an exemplary system of some embodiments.

FIG. 1 illustrates a schematic block diagram of an exemplary system 100 of some embodiments. Specifically, this figure illustrates data flow and user access provided by some embodiments. As shown, the system includes various sources 110, which may be included in a grouping of sources 120, a data processing module 130, a configuration module 140, and various content elements 150 that may be included in one or more groupings 160.

Each source 110 may be a network-connected resource that may provide various types of data used by the system. For example, the sources may include various databases, forms, etc. The sources may include various government agencies, child care providers, management entities, etc. The sources may be associated with various groups 120. Such groupings may be based on various relevant factors (e.g., geographic location or jurisdiction, type of facility, etc.).

The data processing module 130 may be able to receive configuration data from the configuration module 140 and, based on the configuration data, manipulate the data received from sources 110 to generate various content items 150 (e.g., user interfaces, forms, reports, lists, graphs, etc.). Such content items may be associated into groupings 160 based on various relevant factors (e.g., source attributes, configuration attributes, audience attributes, etc.).

In some embodiments, the content items 150 are used to provide various user interfaces that may be customized (by and/or for) various users. For instance, different users may be able to access different interfaces that are directed toward various user types (e.g., administrator, caregiver, parent, social worked, etc.). Throughout this disclosure, the term "user type" may refer to any grouping or listing of users (or even a list of one specific user).

Some embodiments provide a cloud desktop including the content items 150. Such a cloud desktop may be customizable and include multiple dashboards, editors, multiple function screens and utilities that are integrated into one easy to user, customizable user interface.

Multiple pages of dashboards may be provided to each user. The pages may be completely developed and customized by one user and then provided to various other users as specified. In some cases, the pages may provide a default version that is able to be customized by each user if desired.

Such customization may allow for inclusion, placement, and/or other attributes associated with the content items including buttons, announcements, "portlets", etc. In some cases, the buttons, portlets, and/or other elements may be provided from a library of standard features. Such features may be design by, for example, department heads, industry experts, super-administrators, etc. Alternatively, users may be able to define custom elements.

The content items may be access controlled. Access to a portlet or page, for example, may be available to all users, limited to groups of users, limited to types of users (e.g., role, job title, etc.), and/or made available based on other appropriate factors (e.g., geographic region, user preferences, etc.).

An administrator or user with appropriate access level may be able to create custom content elements, based on various filters. Such content elements may include data in various formats (e.g., lists, graphs, statistical representations, etc.). In addition, presented information may depend at least partly on live data, stored data, and trending topics.

Some embodiments may include content elements such as favorite reports that allow a user to quickly access frequently used reports. Some embodiments may include a notepad section that allows for creation of dynamic notes specific to each user (and/or to be distributed to a group of users). In addition, some embodiments may include an announcements section that allows an administrator to include links to documents, files, etc. that are available through the system of some embodiments.

B. Hardware Architecture

Figure 2:
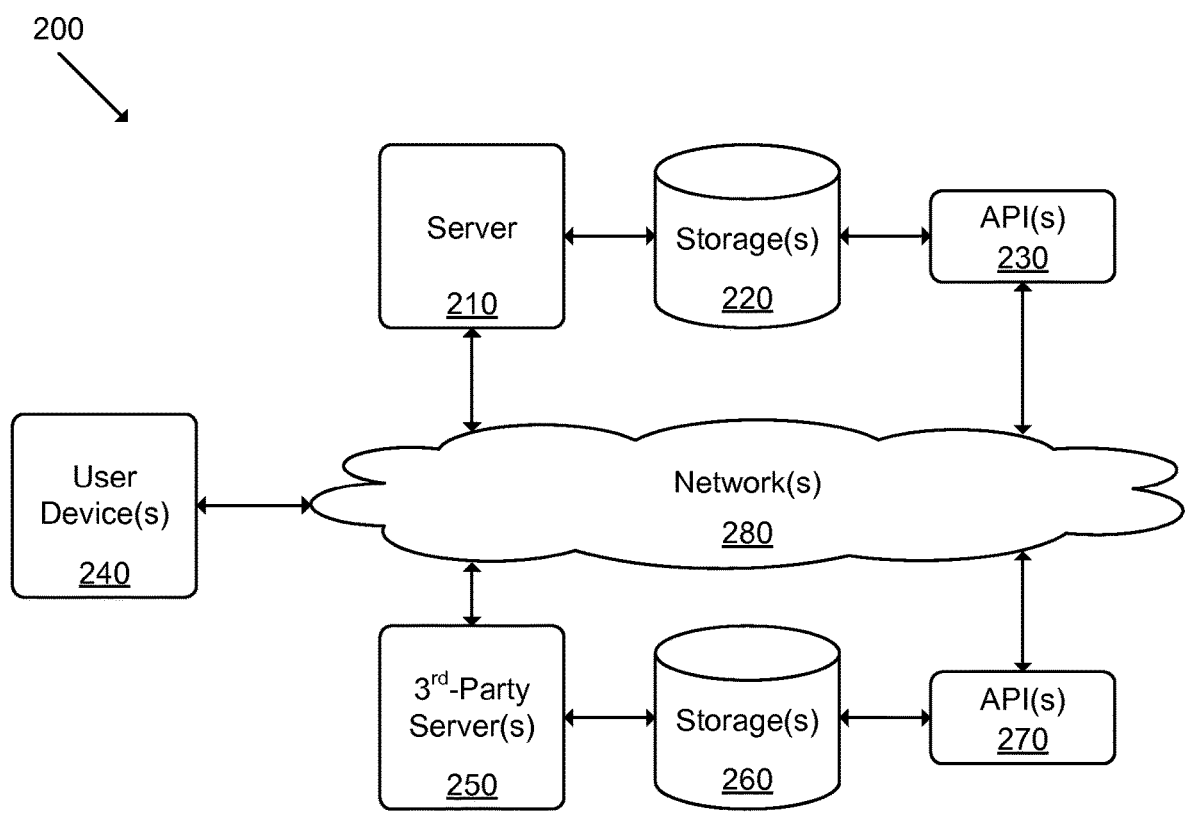
FIG. 2 illustrates a schematic block diagram of an exemplary hardware system of some embodiments.

FIG. 2 illustrates a schematic block diagram of an exemplary hardware system 200 of some embodiments. As shown, the system may include a server 210 with associated storages 220 and application programming interface (API) 230, user devices 240, third-party servers 250 with associated storages 260 and API 270, and a set of networks 280.

Each server 210 may be a computing device that is able to execute software instructions and/or access data to provide various features of some embodiments. The server may be able to communicate with other system elements across networks 280 (and/or via local connections). The storage 220 may be able to store data and/or instructions and may be accessible to the server 210. The API(s) 230 may allow other system resources to access the storage 220. Alternatively, other resources may access the storage by communicating with the server 210.

The user device 240 may be any computing device such as a personal computer, tablet, smart phone, etc. The user device may be able to communicate with the server 210 and/or other system elements via the networks 280. The user device 240 may include various appropriate interface elements (e.g., touchscreens, displays, buttons, microphones, speakers, etc.). Such elements may be used to provide information to a user and/or to receive information, commands, etc. from a user.

The third-party servers 250 may be computing devices able to execute software instructions. The servers may be associated with external entities (e.g., government agencies, child care providers, etc.) and may provide access to data stored in storages 260. Such access may be provided via the servers 250 and/or APIs 270.

The networks 280 may include various wired and/or wireless communication pathways. For instance, the networks may include Ethernet networks, cellular networks, local area wireless networks, the Internet, etc.

C. Software Architecture

Figure 3:
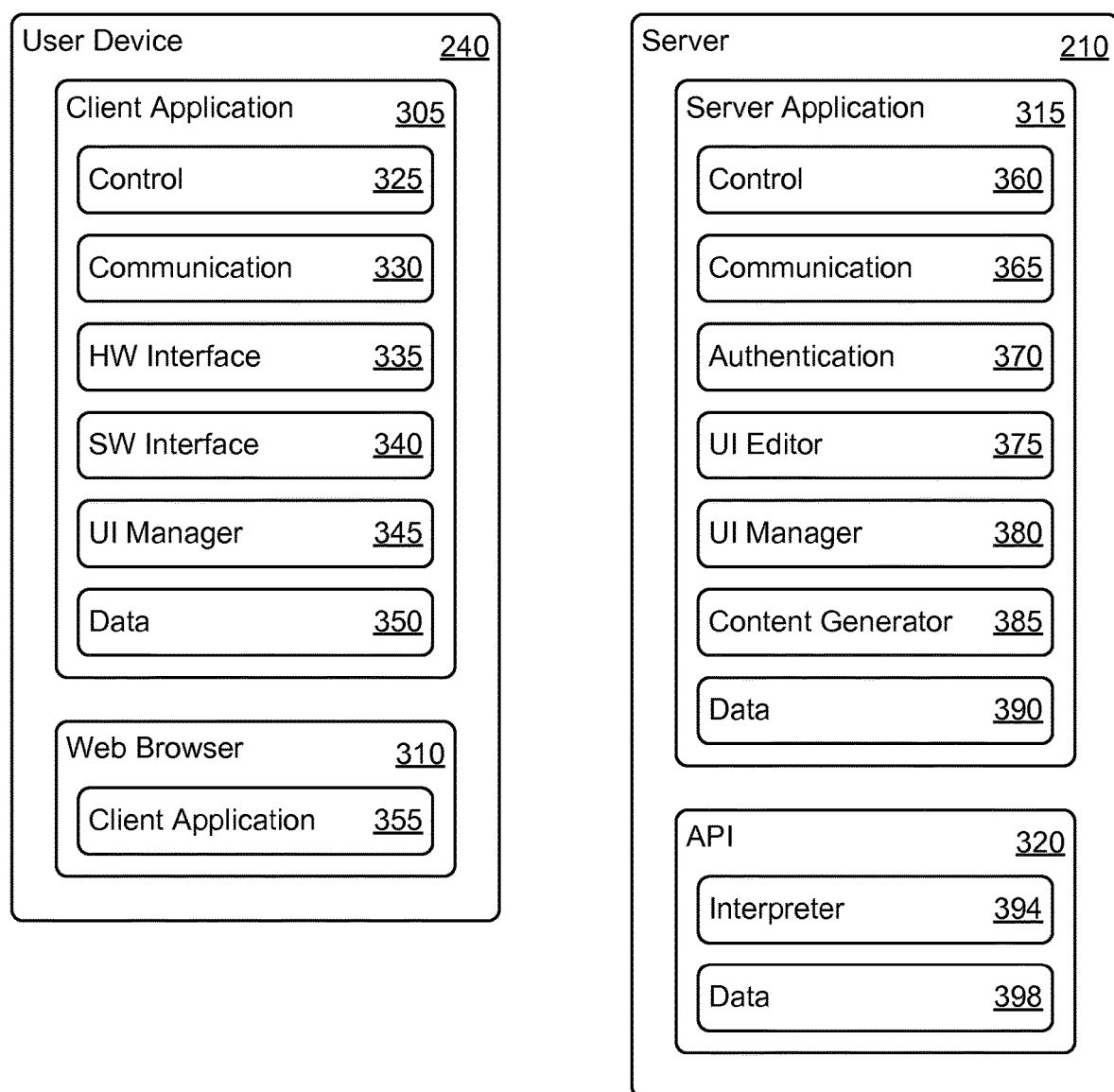
FIG. 3 illustrates a schematic block diagram of an exemplary software system of some embodiments.

FIG. 3 illustrates a schematic block diagram of an exemplary software system 300 of some embodiments. In some cases, the software system may be at least partially implemented using hardware components (e.g., circuitry including logic gates, controllers, signal processors, etc.). As shown, the system includes elements executed by user device 240 and server 210. The user device 240 may execute a client application 305 and/or a web browser 310. The server 210 may execute a server application 315 and/or provide an API 320.

The client or client-side application 305 may include a control module 325, a communication module 330, a hardware interface 335, a software interface 340, a user interface (UI) manager 345, and a data module 350.

The control module 325 may at least partly control the various operations of the other modules, manage communication among modules, and/or otherwise coordinate execution of the client application 305.

The communication module 330 may allow the client application 305 to communicate with other system elements such as server application 315 or API 320. The communication module 330 may be able to use and/or generate messages, commands, and/or other elements that satisfy various protocols used by other system elements, networks, etc.

The hardware interface 335 may allow the application 305 to interact with various physical components of the user device 240. Such components may include, for instance, display screens, touchscreens, keyboards, keypads, buttons, haptic elements, speakers, microphones, data storage elements, etc. The software interface 340 may allow the application 305 to interact with various software components of the user device 240 (e.g., data processing elements, data structures, etc.).

The UI manager 345 may generate, interpret, and/or otherwise manage various UI elements. Such elements may include graphical elements (e.g., display elements, touchscreen elements, etc.) and/or physical elements (e.g., buttons, keypads, etc.). The UI manager 345 may activate and/or generate various UI features depending on inputs provided by a user, available data updates, and/or other relevant factors.

The data module 350 may allow the application 305 to store and/or access data used to provide various application features. Such data may be stored locally on user device 240 and accessed via the hardware interface 335 and/or stored remotely and accessed via communication module 330.

Some embodiments may provide a client application 355 via a web browser 310. Such an application 355 may have similar components to those described in reference to application 305.

The server or server-side application 315 may include a control module 360, a communication module 365, an authentication module 370, a UI editor 375, a UI manager 380, a content generator 385, and a data module 390.

The control module 360 may at least partly control the various operations of the other modules, manage communication among modules, and/or otherwise coordinate execution of the server application 315.

The communication module 365 may allow the server application 315 to communicate with other system elements such as client application 305 or third-party APIs. The communication module 365 may be able to use and/or generate messages, commands, and/or other elements that satisfy various protocols used by other system elements, networks, etc.

The authentication module 370 may be able to identify a user (e.g., using a login and password) and may inform other application components of the user type (or status, or other relevant parameter) so as to allow for controlled access to various features and/or content of some embodiments.

The UI editor 375 may receive various UI parameters and/or selections and may generate UI updates such that a user is able to modify UIs provided by some embodiments. The UI manager 380 may allow a user to control access to various UIs and/or UI elements or content.

The content generator 385 may allow users to generate content for inclusion in various UIs. Such content may include, for instance, reports, lists, forms, graphs, reminders, etc. In addition, the content may include various UI elements (e.g., buttons, menus, display elements, etc.).

The data module 390 may allow the application 315 to store and/or access data used to provide various application features. Such data may be stored locally on server 210 (or storage 220) and accessed via the hardware interface 335 and/or stored remotely and accessed via communication module 330.

The API 320 may be provided via the server 210 and/or by storage 220 (which may be accessed using various interfaces). The API 320 may include an interpreter 394 and a data module 398. The interpreter 394 may able to decipher messages received from other system components and retrieve appropriate data via the data module 398 and pass such data to an external component (e.g., client application 305 or 355). The data module 398 may allow the API 320 to store and/or access data, as appropriate.

One of ordinary skill in the art will recognize that the systems and components described above in reference to FIGS. 1-3 may be implemented in various different ways than described. For instance, different embodiments may include different specific modules or components, may combine and/or divide various modules, may include different communication pathways, etc.

II. Exemplary User Interfaces

A. Dashboard

Figure 4:
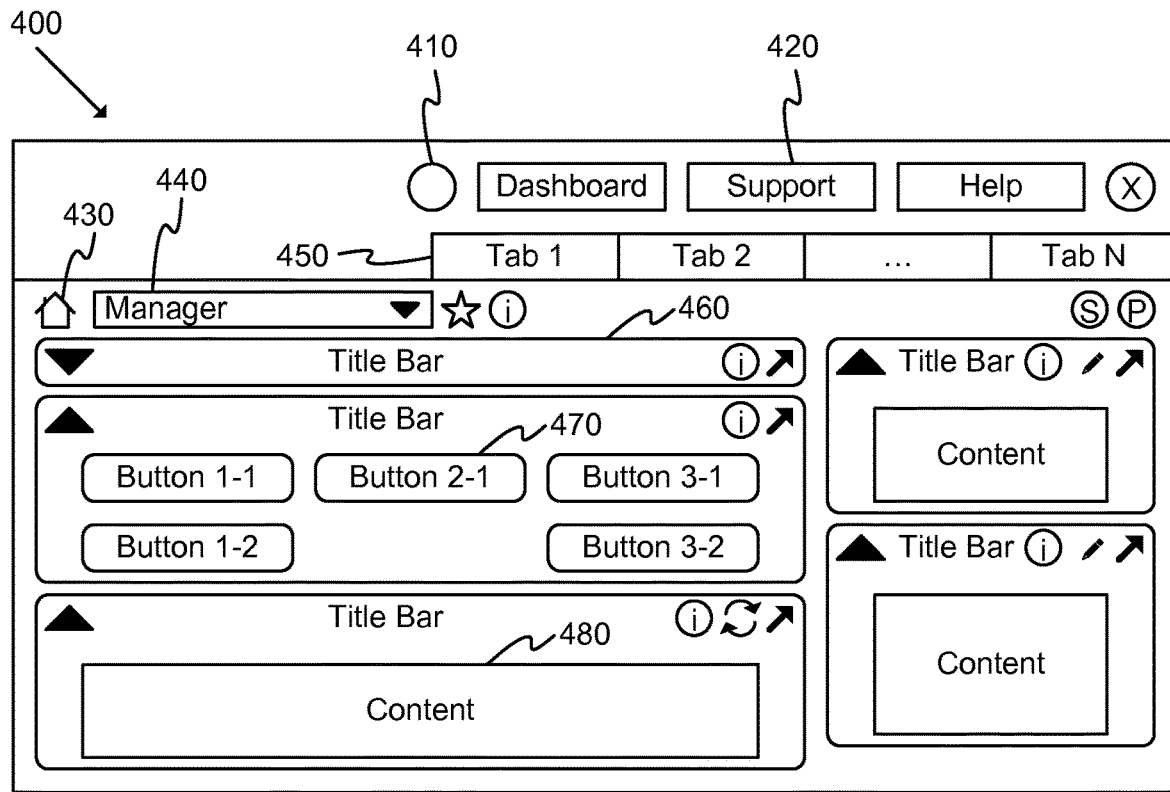
FIGS. 4-5 illustrate exemplary graphical user interfaces of a dashboard of some embodiments.

FIG. 4 illustrates an exemplary GUI 400 of a dashboard of some embodiments. Such an interface may be presented using a touchscreen, display screen, and/or other appropriate element of a user device 240. User inputs may be received via the touchscreen or via other input elements (e.g., mouse, keyboard, keypad, microphone, etc.). In addition to providing information via the touchscreen or display screen, the user interface may include haptic feedback, audio elements, and/or other types of outputs.

In this example, the GUI 400 includes various buttons 410 and 420, icons 430, pulldown menus 440, tabs 450, content elements 460, element buttons 470, and content 480. Such a dashboard may allow the user to generate pages and/or content items that may be accessed by various types of users. A GUI such as GUI 400 may be presented to users as a default dashboard for new users.

Each button 410 and 420 and/or icon 430 may be of different size, shape, etc. than shown. In addition, the buttons may include text labels and/or other graphical elements. The buttons may be customizable in various ways (e.g., size, shape, graphical features, function, layout within the GUI, etc.) and may provide access to various features (e.g., "my dashboard", "support", "tutorials", "exit", "print", "settings", etc.).

Each menu 440 may allow selection among various sets of elements. In this example, the menu is a drop-down menu that allows selection from among different desktops associated with different types of users (e.g., manager, administrator, parent, social worker, etc.). Each user type may be associated with a different desktop GUI 400 that may include different elements, layouts, tabs, buttons, etc.

As another example, the menu 440 may allow selection among different GUI pages, reminders, etc. In some embodiments, the menu elements may include various status indicators (and/or other indicators). For instance, user access level may be denoted using a number of stars or asterisks. Different menu options may be provided to different sets of users.

Each tab 450 may provide access to various pages associated with the dashboard 400. Such tabs 450 may include, for instance, "inventory", "monitoring", "family", "child", "agency", "admin", "reports", etc. The tabs may allow for customizable names, ability to define colors or other graphic features of the tabs, ability to link the tabs to system pages, system reports, and/or URLs.

Each button 410, 420, icon 430, menu 440 item, tab 450, and/or other appropriate elements may be associated with a user input command. Thus, when a user selects such an input element (e.g., by clicking a button), some action will occur (e.g., the interface may present a different page or dashboard, various content elements may be updated, a pop-up form or resource may be launched, etc.).

Each content element 460 (or "portlet", "dashlet", or "frame") may include various features such as a title bar, buttons 470, icons, content 480, etc. The content elements 460 may be able to be expandable or collapsible based on user inputs. The buttons 470 may allow for selection among various options. Such options may be associated with other pages, reports, forms, reminders, etc. The content 480 may include, for example, reports, lists, graphs, tables, multimedia content, etc. Such content may be provided using HTML, video, multimedia, etc. The content may be able to advance through a playlist of sub-content elements.

In some embodiments, each dashboard may include, for example, announcement elements that are generated by a server and distributed to all users. Such announcements may be at least partially access-controlled such that the distributor may select sub-sets of users (or types, or categories) that should receive the announcements.

In addition to customizable tabs or buttons that may be associated with various system resources and the ability to provide multiple dashboards, some embodiments may provide a customizable space for each user to upload or post content such as photographs, videos, etc.

Figure 5:
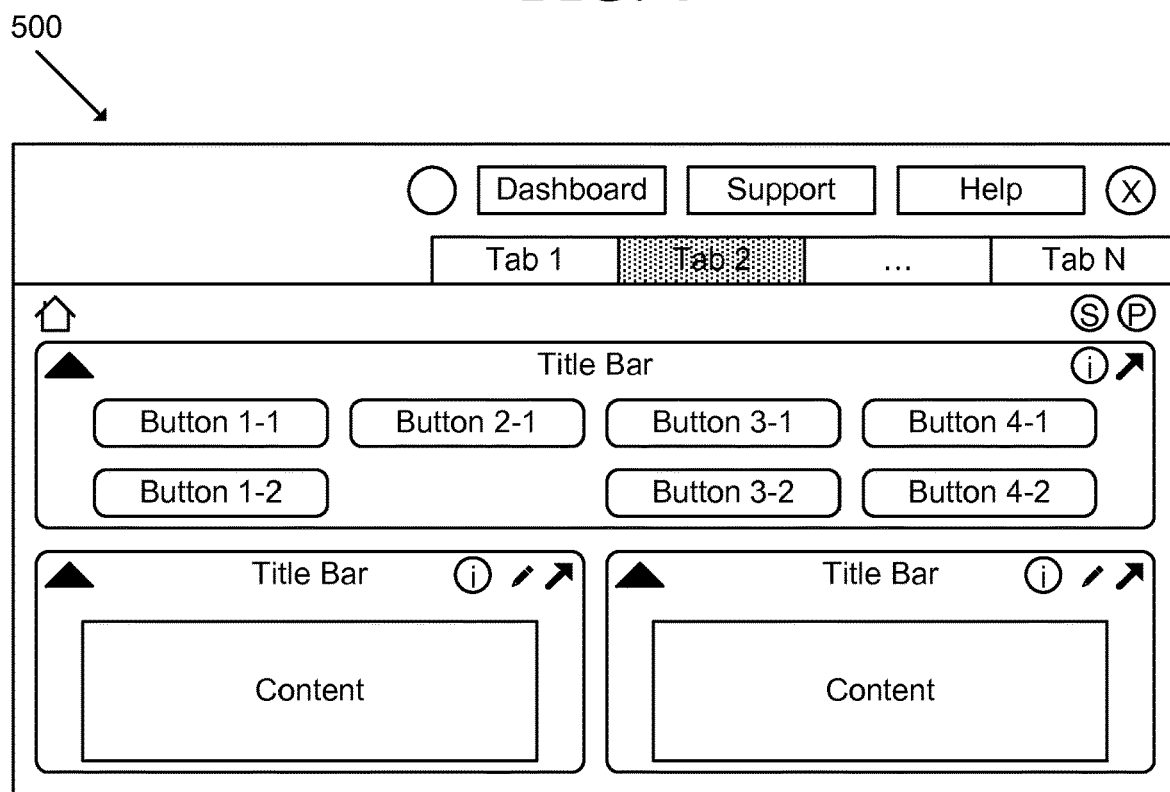

FIG. 5 illustrates another exemplary GUI 500 of a dashboard of some embodiments. As shown, many of the elements may be similar to those described in reference to GUI 400. The content may be customized for the particular user type and/or based on previous user customization (and/or general preferences).

Some of the content elements 460 may be user-customizable. The customization options may depend on the type of content, the type of user, and/or other relevant factors. For instance, in some cases the content data (e.g., type of content, represented data, etc.) may be fixed by an administrator and not able to be modified by an end user but the display attributes (e.g., color, font, size, formatting, etc.) may be customized by the end user.

B. Dashboard Definition and Customization

FIG. 6 illustrates an exemplary GUI 600 used to define or customize dashboards of some embodiments. Such a GUI may be invoked, for instance, when a user selects an option such as "personalize dashboard pages" from a pull-down menu. In this example, a portlet 610 includes various features related to dashboard pages associated with a particular user.

As shown, the portlet may include various options associated with page creation (e.g., page name input box, "add new page" button, etc.). In addition, the portlet may include various filter options. Such options may include, for example, one or more pull-down menus. Such menus may include options related to users (e.g., "all users", specific users, etc.). Some embodiments may allow filtering by user type, group membership, and/or other relevant factors. A user may apply the filtering using a button such as "filter" and may remove filter limitations using a button such as "view all".

The portlet may include a table listing all dashboard pages associated with the user. As shown, the table may include elements such as identification number, name, information, access control options, actions, etc. Some embodiments may include other information such as a home page indication, information related to dashboard ownership, creation, and/or modification, and/or other relevant information. Various elements in the table may provide selectable links (as indicated by underlined text in portlet 610), while other elements may provide information only.

In this example, each dashboard page name may be selectable and may invoke a dashboard editor tool. Each "info" label may invoke, for example, a pop-up window that provides information related to the portlet.

The action elements may include, for example, "copy", "access", and "delete", which may be selected to copy a page, control access to a page, and delete a page, respectively. Different embodiments may provide different specific actions. In addition, the available actions may depend on user type and/or access level (e.g., an administrator or super user may have all available options for each page, while another user may only be able to copy pages but not delete pages or control access, etc.).

In this example, the portlet includes an "exit to dashboard" button which may return the user to the previously-viewed dashboard, to a default or "home" dashboard, and/or otherwise appropriately navigate the user away from the dashboard customization portlet 610.

FIG. 7 illustrates an exemplary GUI 700 used to define or customize a dashboard of some embodiments. As shown, the GUI includes a portlet 710 that may be used to create or modify a dashboard page. Such a portlet may be invoked, for instance, by selecting the "add new page" button of portlet 610 or selecting a dashboard page name link from the table of portlet 610.

Portlet 710 may include, for example, a dashboard name box, layout options (e.g., number of columns, column spacing, etc.), lists 720 of available portlets to add to the dashboard, and lists 730 of portlets selected for inclusion in the dashboard. In this example, a user has selected a three column layout where each column utilized a third of the page width. Different embodiments may include different layout options. For instance, a user may be able to select from layouts having one to four columns. Such columns may include different spacing options which may depend on the number of columns selected. Such column and spacing options may be selected from pull-down menus, may be specified using input boxes, and/or may be otherwise selected by users.

The list 720 of portlets may be organized by group and portlet. Portlets may be grouped based on various relevant criteria (e.g., data source, report source type, favorites, user association, etc.).

A user may select one or more portlets from the list and add the portlets to the included list 730 using an appropriate button or other action item. A user may be able to similarly remove portlets from the included list. In addition, although this example shows only one portlet in the included list, the list may include multiple portlets which may be ordered by a user.

FIG. 8 illustrates an exemplary GUI 800 used to define or customize access control to a dashboard of some embodiments. Such a GUI may be invoked, for instance, when a user selects a "save/change dashboard page settings" button from portlet 710 or selects an "access" action link from portlet 610.

As shown, portlet 810 may include various menus and/or selectable lists associated with different access types. In this example, view, edit, and copy access are able to be selected by the user. In some cases, a user may only be able to customize a sub-set of access types (e.g., only view access).

In this example, view access has been set to selected groups (with "group 5" and "group 7" selected from a list of available groups). Edit access has been set to "no access" (i.e., only the page owner has edit privileges) and copy access has be set to allow access by specific users (with "user 2" selected from a list of available users). Access options may include, for instance, "no access", "access to all users", "access to selected groups", "access to selected users", etc.

FIG. 9 illustrates an exemplary GUI 900 used to define or customize dashboards of some embodiments. In this example, GUI 900 may be an updated version of GUI 600 after a user has created the dashboard "dname 1" using operations such as those described in reference to FIGS. 6-8.

C. Access Control

As described above in reference to FIG. 8, different users (or groups of users) may be associated with different levels of access to content. In some embodiments, various users (or user types) may be associated with various default levels of access.

Figure 10:
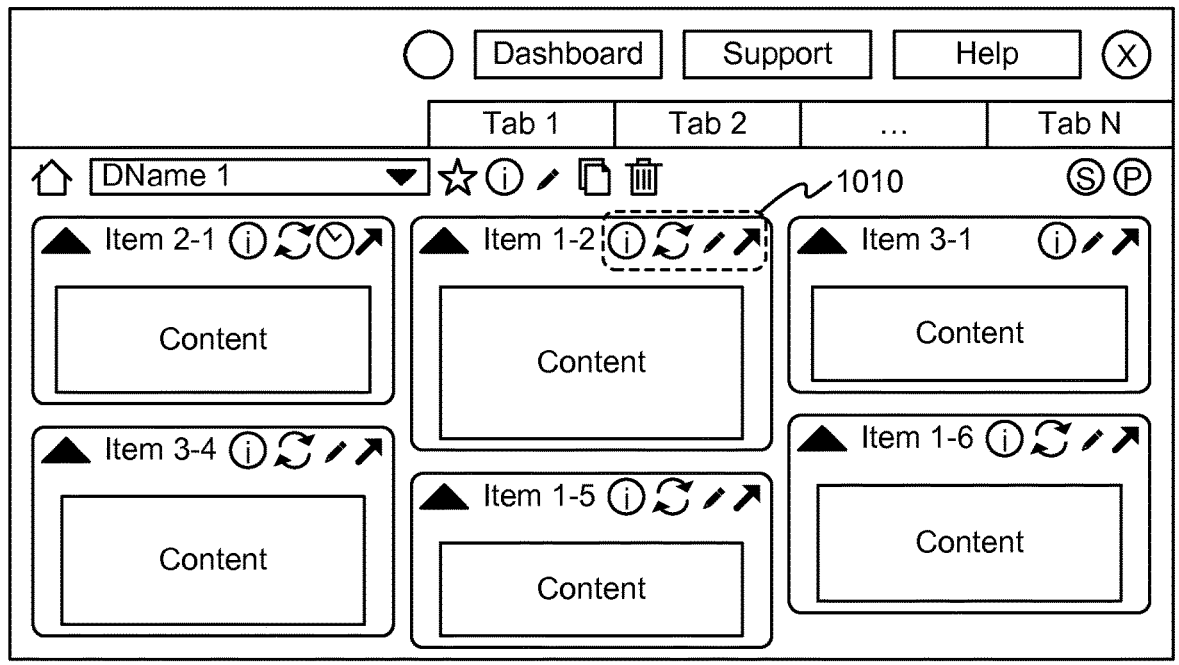
FIGS. 10-11 illustrate an exemplary graphical user interface as presented to different users in some embodiments.

FIG. 10 illustrates an exemplary GUI 1000 as presented to a first user in some embodiments. The GUI 1000 may be associated with the "dname 1" dashboard described above. In this example, multiple portlets are included in the three-column arrangement.

The various icons 1010 may indicate available user interactions with each portlet (e.g., information, refresh, schedule, edit, expand, etc.). Different users may have different access levels to each portlet (e.g., different users may be able to edit different sets of portlets).

Figure 11:
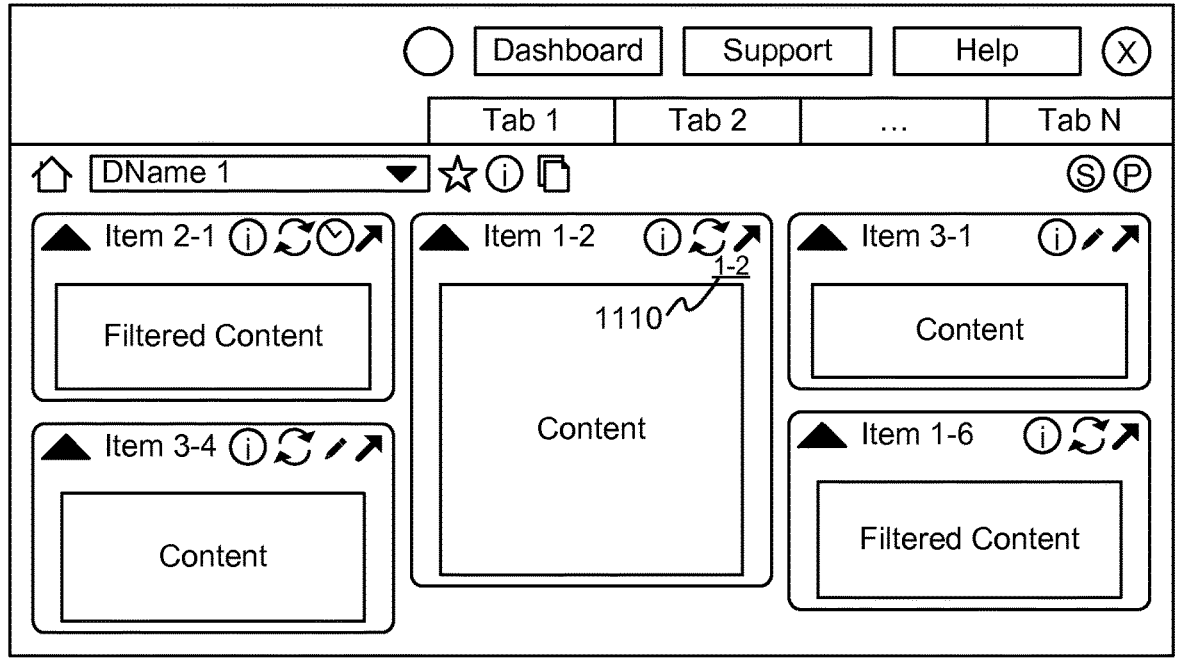

FIG. 11 illustrates an exemplary GUI 1100 as presented to a second user in some embodiments. In this example, many of the icons 1010 are different, indicating the different privilege levels for the second user in regard to each portlet. In addition, the portlet associated with item 1-5 is not included in GUI 1100 as the second user does not have view access to that portlet in this example.

In some cases, the portlet associated with item 1-2 may automatically expand to fill space vacated by the portlet that is not available to the second user. In some cases, the content associated with the portlet may be filtered (and/or otherwise modified) such that the second user may automatically be presented with different content or data than the first user via the same portlets.

As shown in GUI 1100, each portlet may include a link 1110 associated with a report type, data source, etc. Such a link may allow a user to customize content filtering.

D. Portlet Definition and Customization

Figure 12:
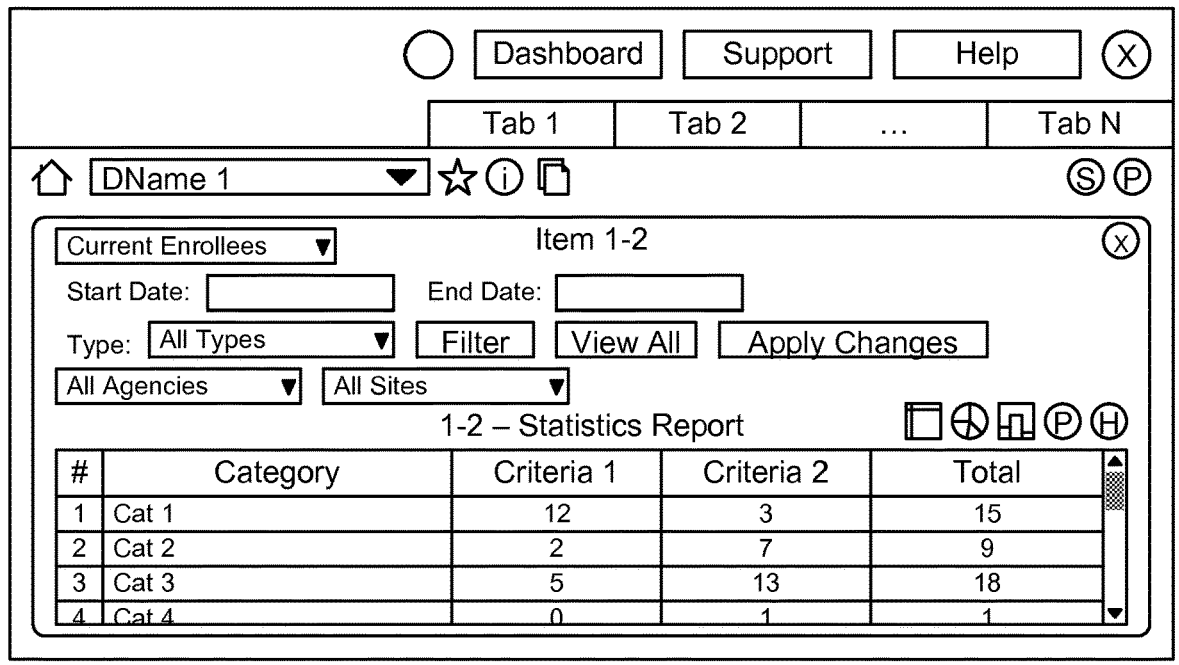

FIG. 12 illustrates an exemplary GUI 1200 used to filter portlet content in some embodiments. Such a GUI may be invoked, for instance, using link 1110, selecting a portlet edit icon, etc.

As shown, a user may be able to filter content using various pulldown menus (e.g., selecting among groups of students such as "current", "all", "former", etc.). In addition, various input boxes may be provided (e.g., start date, end date, etc.). Other pulldown menu options may include, for instance, selections among agencies (e.g., all agencies, specific agencies, etc.), sites, types, etc.

The GUI 1200 may include selection buttons such as "filter" which may apply the specified filters to the available data, "view all" which may remove all filters, and "apply changes" which may apply the currently specified filters to the portlet for future use.

In addition, the GUI 1200 may allow a user to view the filtered data in various formats (e.g., table, pie chart, bar chart, etc.). Other options may be provided, such as "print", "help", etc. In this example the data is presented in a table. Different portlet types may include various different filter elements, as appropriate.

Figure 13:
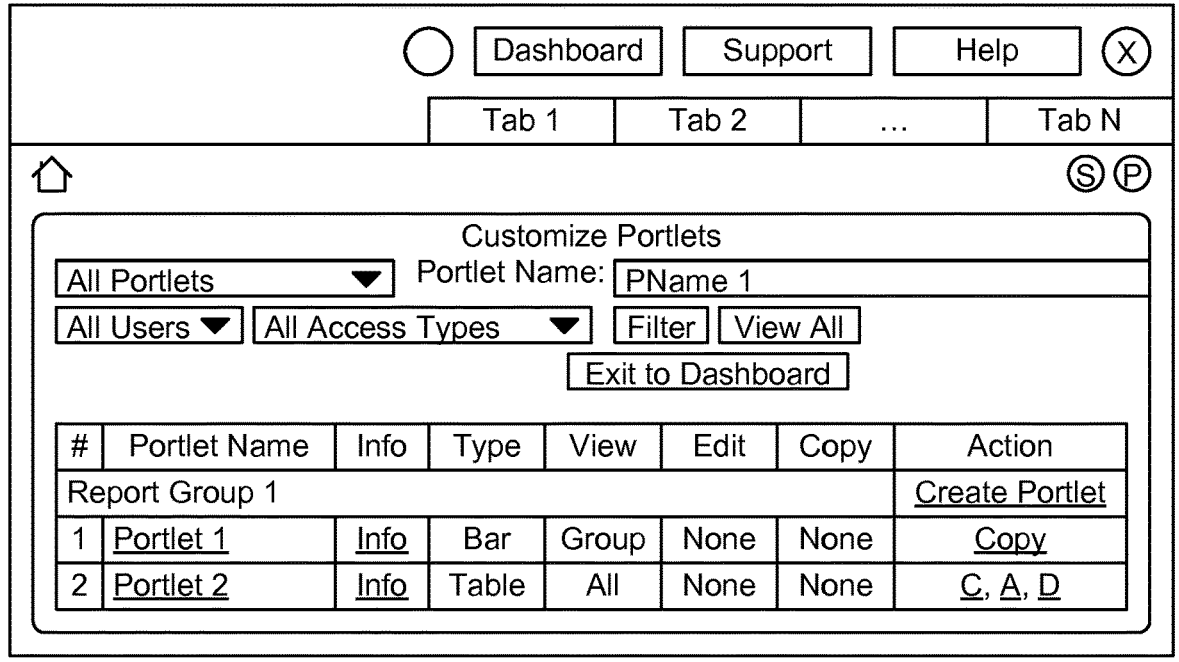

FIG. 13 illustrates an exemplary GUI 1300 used to define or customize portlets of some embodiments. Such a GUI is analogous to GUI 600 or GUI 900 for dashboards. As shown, various filters may be applied, input boxes provided, and/or other relevant features. A user may be able to view summary information in a table or via an "info" link. The user may be able to initiate various actions (e.g., "copy", "delete", "access control", "create portlet", etc.).

FIG. 14 illustrates an exemplary GUI 1400 used to define or customize a portlet of some embodiments. In this example, various filter options may be applied, a display type may be selected, initial display defined, and/or the portlet may be otherwise defined. In this example, the portlet may be associated with a data source (e.g., a table or database) such that specific data from the source may be provided by the portlet according to the user-specified properties of the portlet.

FIG. 15 illustrates an alternative exemplary GUI 1500 used to define or customize a portlet of some embodiments. In this example, rather than being associated with a data source, the user may apply custom content to the portlet. Such content may include, for example, formatted text, multimedia content (e.g., video, audio, etc.), graphic content (e.g., pictures, drawings, etc.), presentation content, etc.

Different embodiments may include different specific interfaces that may be selected based on a type of content to be included (e.g., a first interface may be associated with database information, a second interface may be associated with multimedia content, a third interface may be associated with text-based content, a fourth interface may be associated with graphic content, etc.

Portlet access control may be implemented using a GUI similar to GUI 800 described above. Depending on the level of user access, portlet changes may be applied such that the changes affect other users. For instance, an administrator may update portlet content thus causing the updated content to be provided by all users that access the portlet. As another example, a lower-level user may update portlet filtering where the updated filtering is only applied for that user and other users may access the portlet with the default filtering (or their own specified filtering).

One of ordinary skill in the art will recognize that the GUIs 400-1500 are provided for example purposes only and that different embodiments may be implemented in various different ways. For instance, different embodiments may include different numbers of elements, different layouts, different types of elements, different options within elements, etc. In addition, various interfaces may include additional elements (e.g., pop-up windows or menus, streaming audio, etc.), omit various elements (e.g., one or more content elements, buttons, etc.), and/or arrange the elements in different ways than shown.

III. Methods of Operation

A. User Authorization

Figure 16:
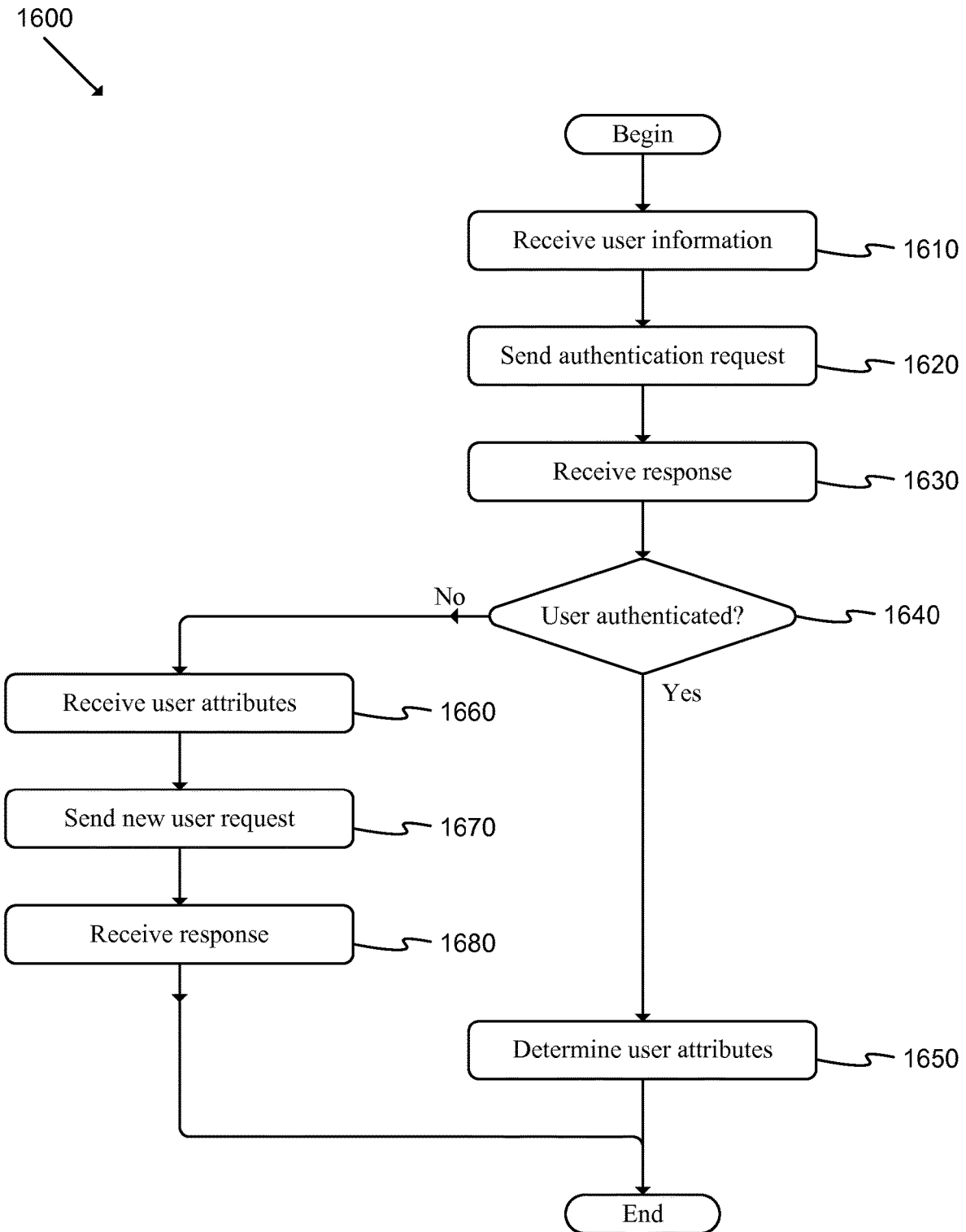
FIG. 16 illustrates a flow chart of an exemplary client-side process that authenticates a user.

FIG. 16 illustrates a flow chart of an exemplary client-side process 1600 that authenticates a user. Such a process may be executed by a device such as user device 240 and/or by elements of client application 305 or 355. The process may begin, for instance, when a user launches a client-side application of some embodiments or accesses a URL associated with some embodiments.

As shown, the process may receive (at 1610) user information. Such information may include, for instance, a username and password. The information may be received via a GUI or other appropriate interface using a touchscreen, keyboard, and/or other appropriate hardware.

Next, the process may send (at 1620) an authentication request to a server-side application. Such a request may include, for instance, the user information, user device information, etc. Process 1600 may then receive (at 1630) a response from the server. The response may include information such as an authentication approval or denial, a user access level or type, and/or other relevant information.

The process may then determine (at 1640) whether the user is approved, based at least partly on the response from the server. If the process determines that the user is approved, the process may determine (at 1650) user attributes based at least partly on the response and then may end. Such attributes may include, for instance, user type, user preferences, etc.

If the process determines (at 1640) that the user is not approved or authenticated, the process may allow the user to try again (e.g., by re-entering a password) or create (or activate) an account. The process may then receive (at 1660) user attributes (e.g., username and password, user type, etc.), send (at 1670) a new user request, receive (at 1680) a response, and then may end.

Figure 17:
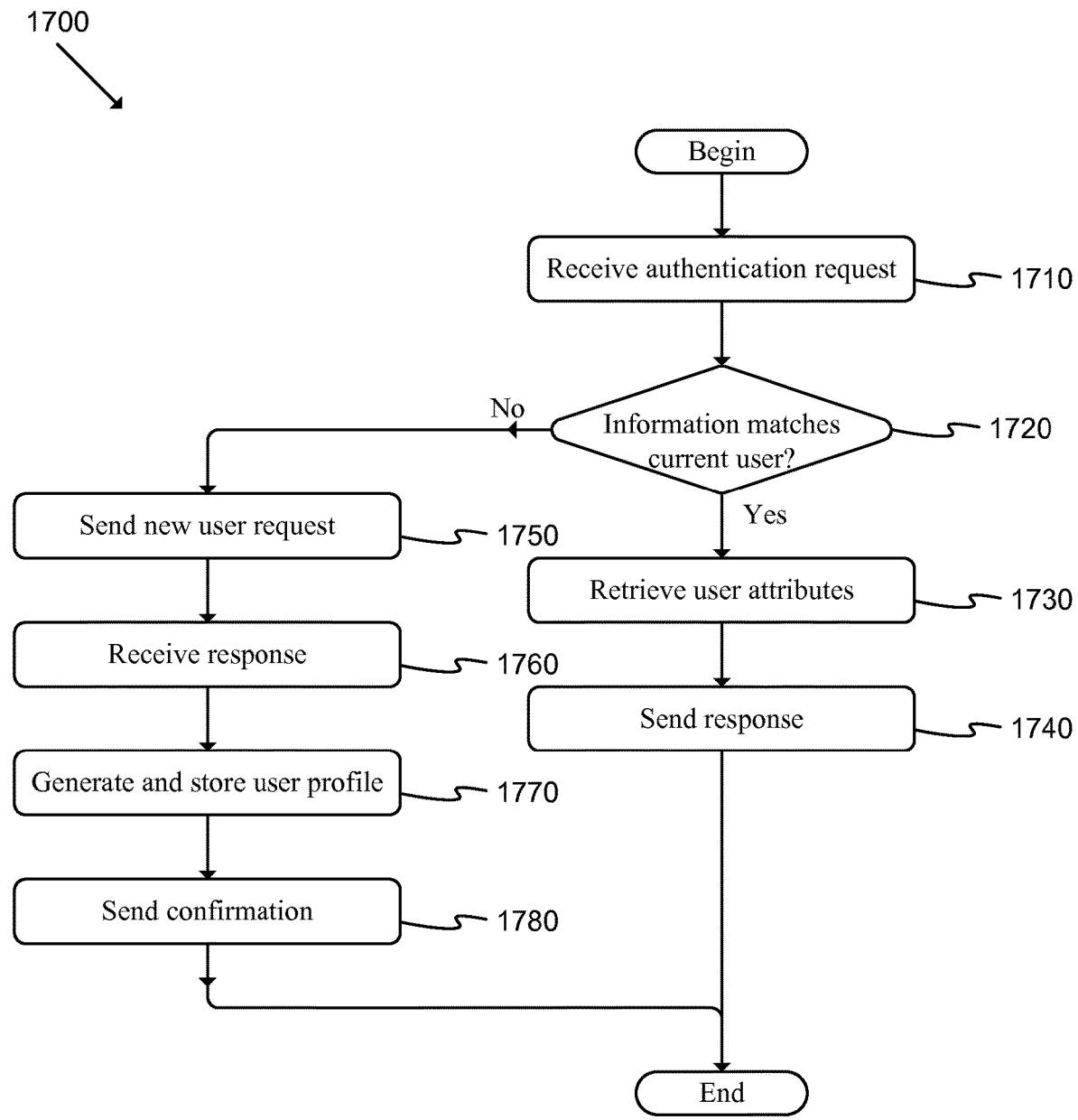
FIG. 17 illustrates a flow chart of an exemplary server-side process that authenticates a user.

FIG. 17 illustrates a flow chart of an exemplary server-side process 1700 that authenticates a user. Such a process may be executed by a device such as server 210 and/or by elements of application 315 and/or API 320. The process may be executed as a complement to process 1600. The process may begin, for instance, when a server is powered on or a URL of some embodiments is accessed.

As shown, the process may receive (at 1710) an authentication request from a client. The authentication request may include information such as a username and password. The process may then determine (at 1720) whether the received information matches information associated with a current user. In addition, other authentication measures may be undertaken (e.g., verification of new devices, email confirmation, etc.).

If the process determines (at 1720) that the information matches a current user, the process may retrieve (at 1730) attributes associated with the user (e.g., type, access level, preferences, associations, etc.), send (at 1740) a response (e.g., including user attributes, authentication approval and/or denial, etc.), and then may end.

If the process determines (at 1720) that the information does not match a current user, the process may send (at 1750) a new user request including various required information elements (e.g., username, password, etc.), receive (at 1760) a response, generate and store (at 1770) a user profile, send (at 1780) a confirmation, and then may end.

B. User Management

Figure 18:
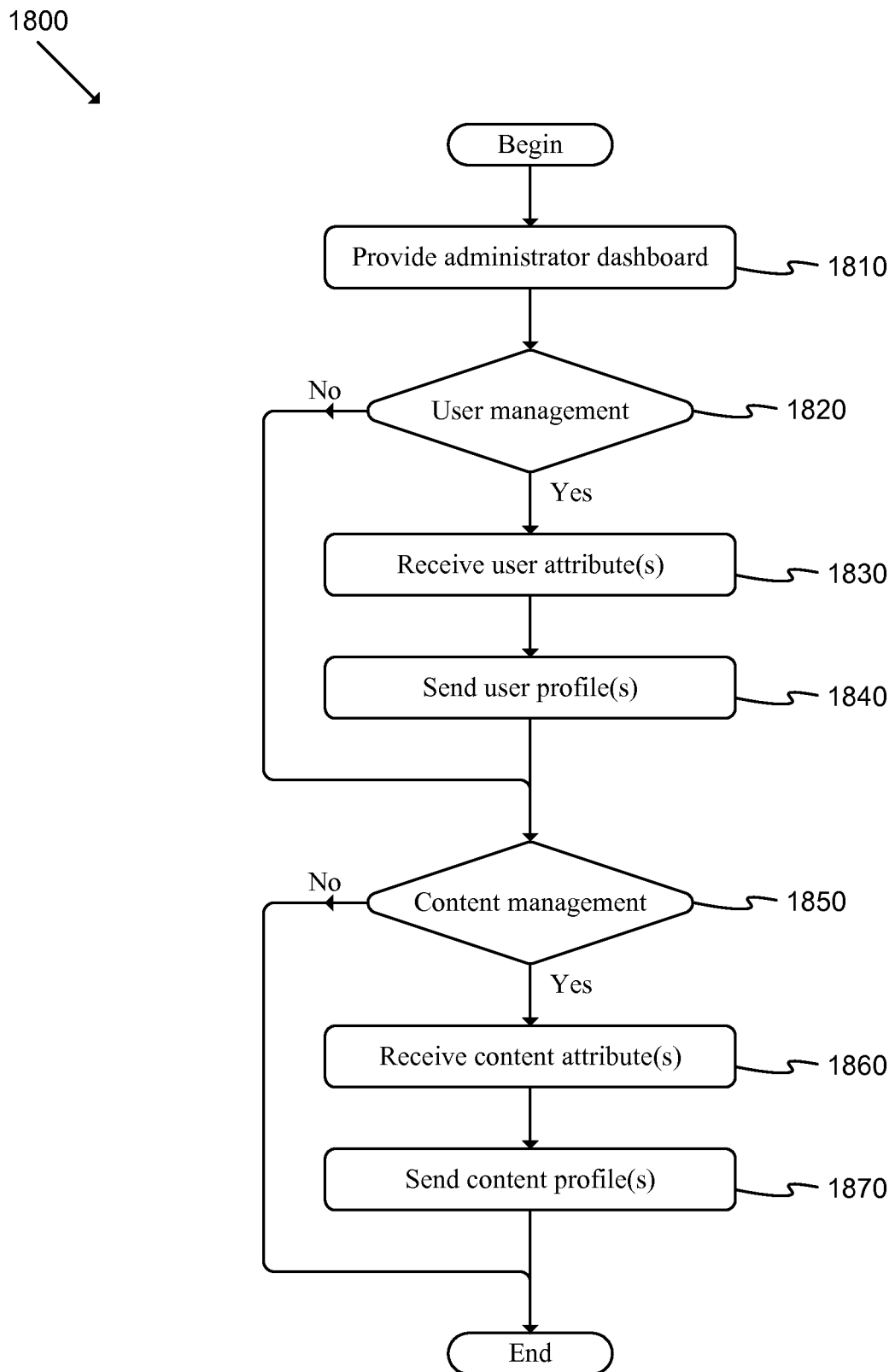
FIG. 18 illustrates a flow chart of an exemplary client-side process that allows user management.

FIG. 18 illustrates a flow chart of an exemplary client-side process 1800 that allows user management. Such a process may be executed by a device such as user device 240 and/or by elements of client application 305 or 355. The process may begin, for instance, after an authentication is received (such as via process 1600).

As shown, process 1800 may provide (at 1810) an administrator dashboard. Such a dashboard may be similar to GUI 400 described above. In this example, administrator refers to a privileged user or super-user. Such a user may have broad authority to create user accounts, assign privileges, generate content, etc.

Next, the process may determine (at 1820) whether to enter a user management mode. Such a determination may be made on various appropriate criteria (e.g., user selection of a GUI element such as a button). If the process determines that the administrator has selected user management, the process may receive (at 1830) user attributes. Such attributes may include, for example, username and password, profile information, user type, access level, etc. The attributes may be associated with new or existing users. Next, the process may generate (or update) and send (at 1840), to a server-side application, user profiles associated with the new or updated users.

After sending (at 1840) the user profiles or after determining (at 1820) not to enter user management mode, the process may determine (at 1850) whether to enter content management mode. Such a determination may be made in various appropriate ways (e.g., based on user selection, default settings, etc.).

If the process determines (at 1850) that content management mode should be entered, the process may then receive (at 1860) content attributes. Such attributes may include, for instance, privileges by user type (e.g., edit privileges may be assigned to a first group of users, view privileges to a second group, and no access to a third group), page association, etc. The process may then send (at 1870) updated content profiles to a server-side application. After sending (at 1870) the content profiles or after determining (at 1850) that content management mode should not be entered, the process may end.

Figure 19:
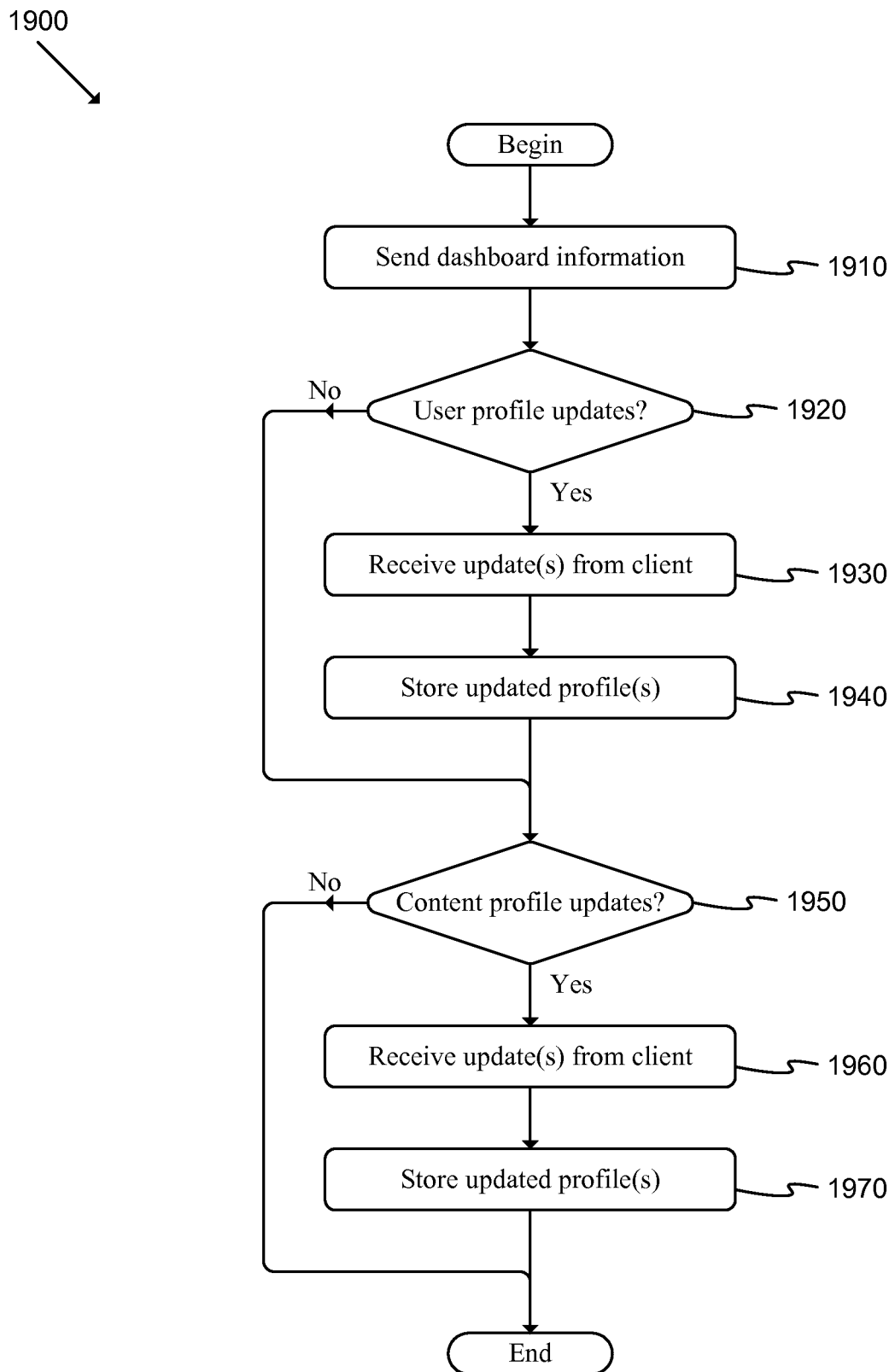
FIG. 19 illustrates a flow chart of an exemplary server-side process that allows user management.

FIG. 19 illustrates a flow chart of an exemplary server-side process 1900 that allows user management. Such a process may be executed by a device such as server 210 and/or by elements of application 315 and/or API 320. The process may be executed as a complement to process 1800.

The process may begin, for instance, after an authentication is provided (such as via process 1700).

As shown, process 1900 may send (at 1910) dashboard information. Such information may be based on a user profile associated with the authenticated user. The dashboard information may include information related to designation of content elements, location of elements, names and other display attributes, etc.

Next, the process may determine (at 1920) whether there are user profile updates. Such a determination may be based on various appropriate criteria (e.g., whether a request for new or updated profiles was received from a client-side application). If the process determines that there are profile updates, the process may receive (at 1930) the updates from the client and store (at 1940) the updated profiles.

If the process determines (at 1920) that there are no updates, or after storing (at 1940) any updates, the process may determine (at 1950) whether there are content profile updates. Such a determination may be made based on various relevant factors (e.g., whether an update message was received from a client).

If the process determines (at 1950) that there are content profile updates, the process may then receive (at 1960) the updates from the client and store (at 1970) the updated profiles. After determining (at 1950 that there are no updates or after storing (at 1970) the updates, the process may end.

C. Content Generation

Some embodiments may allow a user or administrator to customize various content elements. For instance, the user may be able to name each element, customize header color and font, etc. In addition, the users may be able to create, edit, copy, and/or delete various content elements (and/or allow other users to do the same).

Content elements may be based on real time data updates, based on a data associated with a particular point in time, and/or be updated based on scheduled refresh time or user selection. Dashboards may include sets of content elements. Such dashboards may be provided to other users or groups of user with different levels of privilege (e.g., view, edit, copy, etc.). Dashboards and/or portlets may be associated with various types or designations such that they are only made available to specific users after updates.

Content elements may be able to be expanded or contracted by clicking on a frame header or using an expansion button. Some content elements may include a full-page expansion button or icon. In some cases, selection of content associated with a content element may cause the element to expand such that the frame automatically utilizes a full page view. Some embodiments may automatically expand based on content parameters (and/or provide scroll bars).

Each content element may include real-time information, scheduled information, links to existing reports, links to content provided or defined by the user, admin, system, and/or other appropriate information. In addition, content elements may include content such as tables, graphs, pictures, video links, etc. In addition, some embodiments may provide search capability, generation of organizational charts, performance monitoring elements, etc.

Within each content element, links, images, buttons, etc. may be included that may be used to open content within the same element or in a new element, page or window. Each content element may include content based at least partly on data provided by a server database of some embodiments.

Content elements may include reports in numerical and/or graphical format. Such reports (and/or other content) may be provided based on filters such as specified criteria, item selection, timelines, etc. Customized elements may be mapped and linked or placed in specific system areas.

Figure 20:
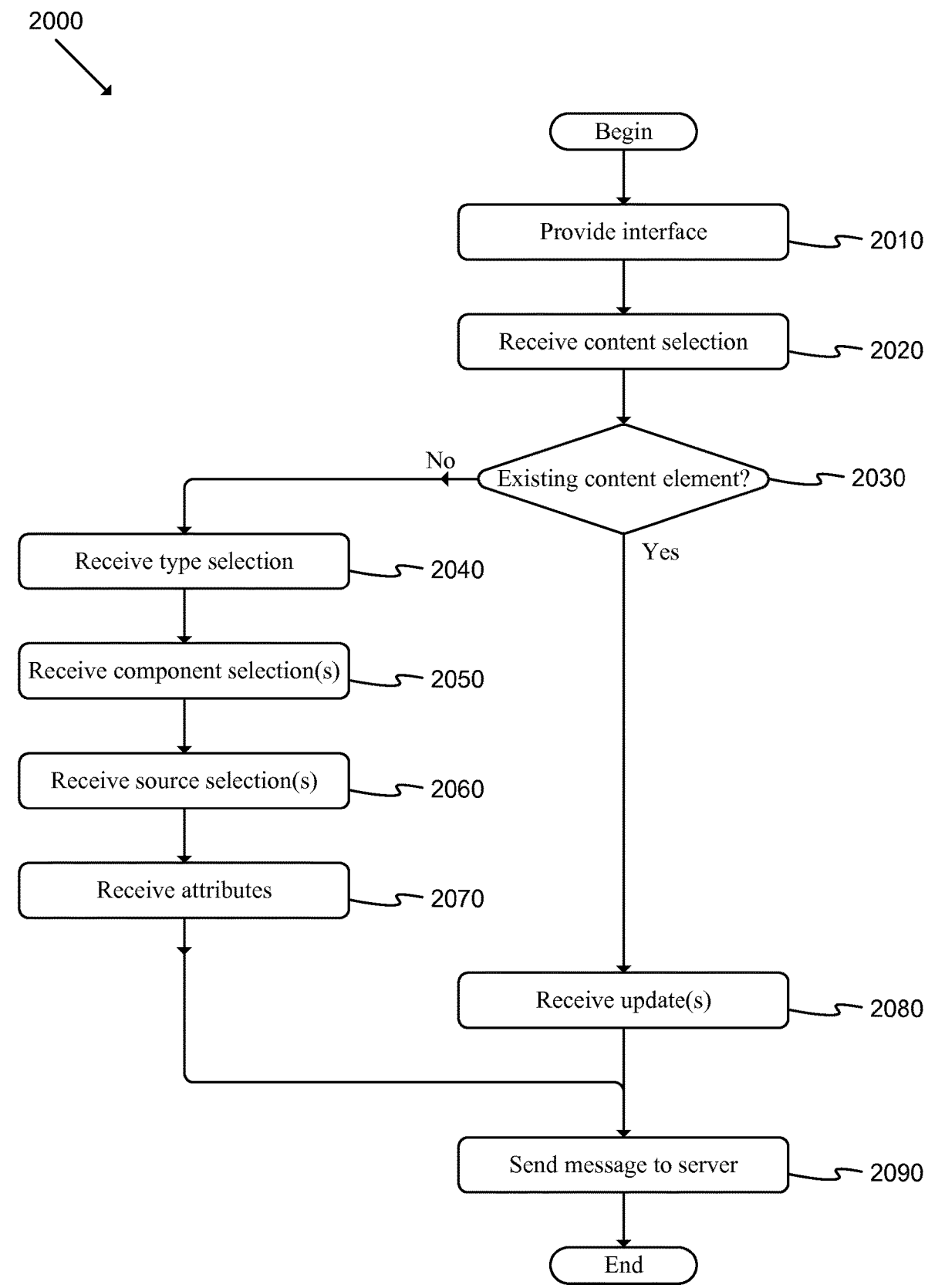
FIG. 20 illustrates a flow chart of an exemplary client-side process that generates content.

FIG. 20 illustrates a flow chart of an exemplary client-side process 2000 that generates content. Such a process may be executed by a device such as user device 240 and/or by elements of client application 305 or 355. The process may begin, for instance, after an authentication is received (such as via process 1600).

As shown, process 2000 may provide (at 2010) an interface to a user. The process may then receive (at 2020) a content selection. Such a selection may be made when a user selects an edit icon associated with a content element, when a user selects an "add content element" button, etc.

Next, the process may determine (at 2030) whether the content element already exists. If the process determines that the content element does not exist, the process may receive (at 2040) a type selection. The type selection may include, for example, a content type (e.g., report, reminder, announcement, etc.). Next, the process may receive (at 2050) component selections. The component selection may specify the component type (e.g., list, table, graph, set of buttons, etc.) and/or refer to previously-defined components available to the user. The process may then receive (at 2060) a set of source selections. Such sources may be used to filter or otherwise specify data sources used to generate the components. For instance, the source selections may include filters based on user type, geographic location, etc. The process may then receive (at 2070) attributes associated with the content element (e.g., size, layout, association to existing dashboards, etc.).

If the process determines (at 2030) that the content element already exists, the process may receive (at 2080) updates. Such updates may include, for instance, updates related to content type, component selections, source selections, and/or attributes. After receiving (at 2080) the updates or after receiving (at 2070) the attributes, the process may generate send (at 2090) a message to the server and then may end. Such a message may include the information collected, for example, at operations 2040-2070 or 2080.

Figure 21:
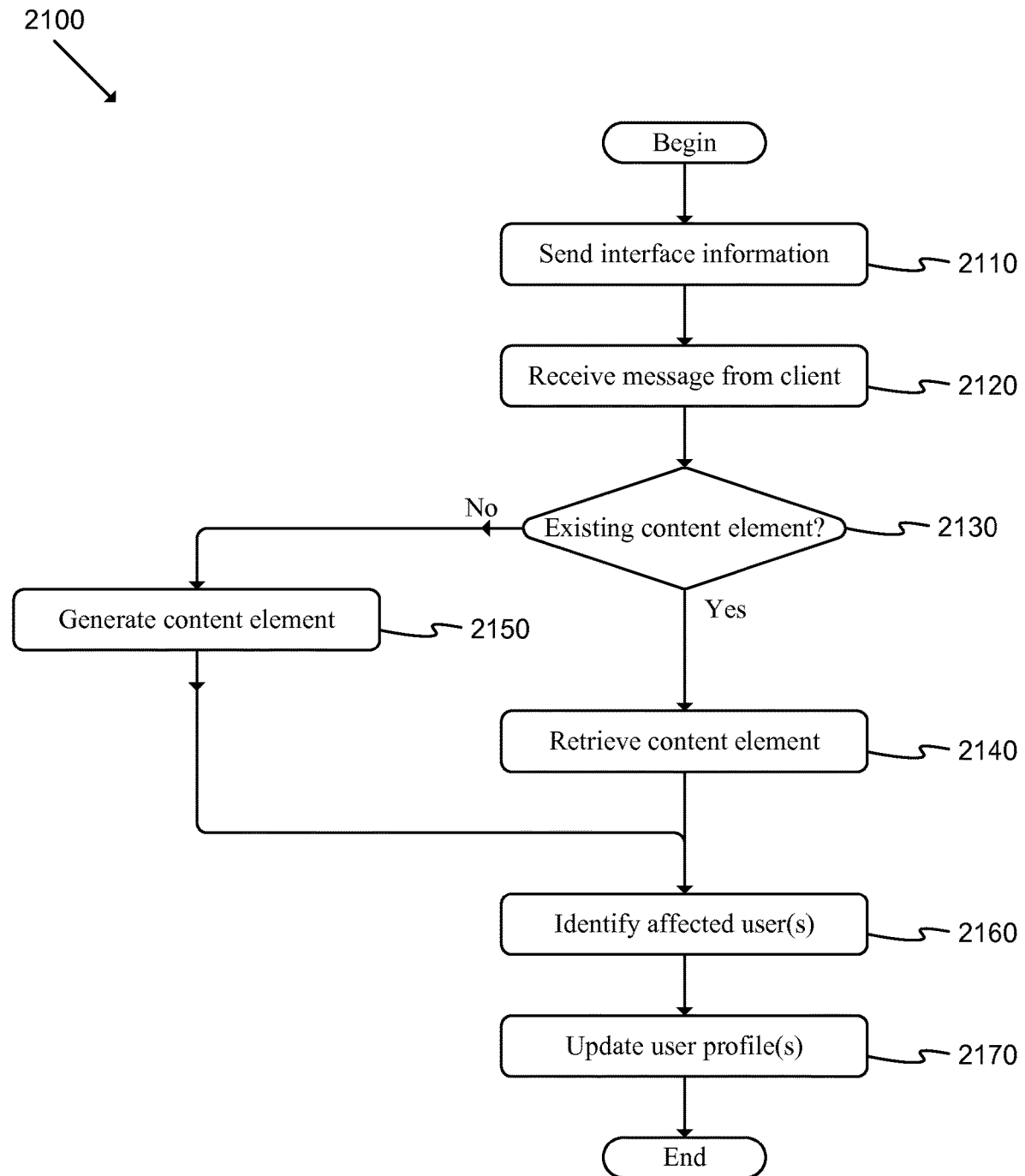
FIG. 21 illustrates a flow chart of an exemplary server-side process that generates content.

FIG. 21 illustrates a flow chart of an exemplary server-side process 2100 that generates content. Such a process may be executed by a device such as server 210 and/or by elements of application 315 and/or API 320. The process may be executed as a complement to process 2000. The process may begin, for instance, after an authentication is provided (such as via process 1700).

As shown, process 2100 may send (at 2110) interface information. Such information may be based on a user profile associated with the authenticated user. The interface information may include information related to designation of content elements, location of elements, names and other display attributes, etc.

Next, the process may receive (at 2120) a message from the client. The process may then determine (at 2130) whether the message is related to an existing content element. If the process determines that the message is related to an existing content element, the process may retrieve the element. If the process determines (at 2130) that the message is not related to an existing element, the process may generate (at 2150) a new content element.

After generating (at 2150) or retrieving (at 2140) the content element, the process may identify (at 2160) affected users. Such users may be identified in various appropriate ways (e.g., retrieving a list of users with access to the element, filtering users based on various relevant factors related to the content element, etc.).

Next, the process may update at (2170) user profiles associated with the identified users and then may end. Such updates may include, for example, updates to pages or dashboards associated with the users where the pages or dashboards access the updated content element. Alternatively, the updates may allow the users to access the content element for inclusion in user-created pages, dashboards, and/or other content elements.

D. Content Management

Some embodiments may allow user to create multiple customized dashboards. The users may be able to customize dashboard features such as name, header color and font, etc. A user may be able to designate a particular dashboard as a home or default page. Users may be able to create, edit, copy, or delete dashboards. Users may grant permission to other users (and/or groups of users) to access, create, edit, copy, or delete dashboards.

Various dashboards may be designated as "default" such that the availability of the dashboard is controlled by the system (e.g., based on membership in a user group, category, job, access level, etc.). Dashboards may also be designated as "custom" such that the availability, format, and/or design of the dashboard may be customized for each client.

In addition to content such as tables, lists, and graphs, dashboards may include, for example, calendar events, file sharing, forms, etc. Some embodiments may allow monitoring of reports and list action plans assigned to the user. The dashboard may include an inbox that lists all forms and processes assigned to a user through a workflow.

Some embodiments may provide an automated calendar or scheduling feature. Such a feature may collect data related to a user. For instance, a school administrator may be associated with a number of students at the school. A subset of those students may be due to receive immunizations within the next quarter. Some embodiments may automatically extract such information and generate a calendar entry corresponding to the list of students to be immunized. Depending on the number of students associated with the user, such an entry may be listed in various different ways. For instance, a teacher-user may receive a list of students that require immunization when the number of students is ten or fewer. In contrast, an administrator-user may receive only a notification indicating the total number of students to be immunized (e.g., "two hundred students due for immunization this quarter").

The automated calendar feature may allow users to define criteria for generating entries. For instance, a first user may wish to receive notifications regarding immunizations while a second user may wish to receive notifications regarding reporting requirements. Other criteria may include, for instance, filtering by due date, filtering by data source, etc.

User may be able to define content associated with a dashboard and/or define format and layout associated with the dashboard elements. Some embodiments may include a tool that provides search capability for content included in a dashboard.

Figure 22:
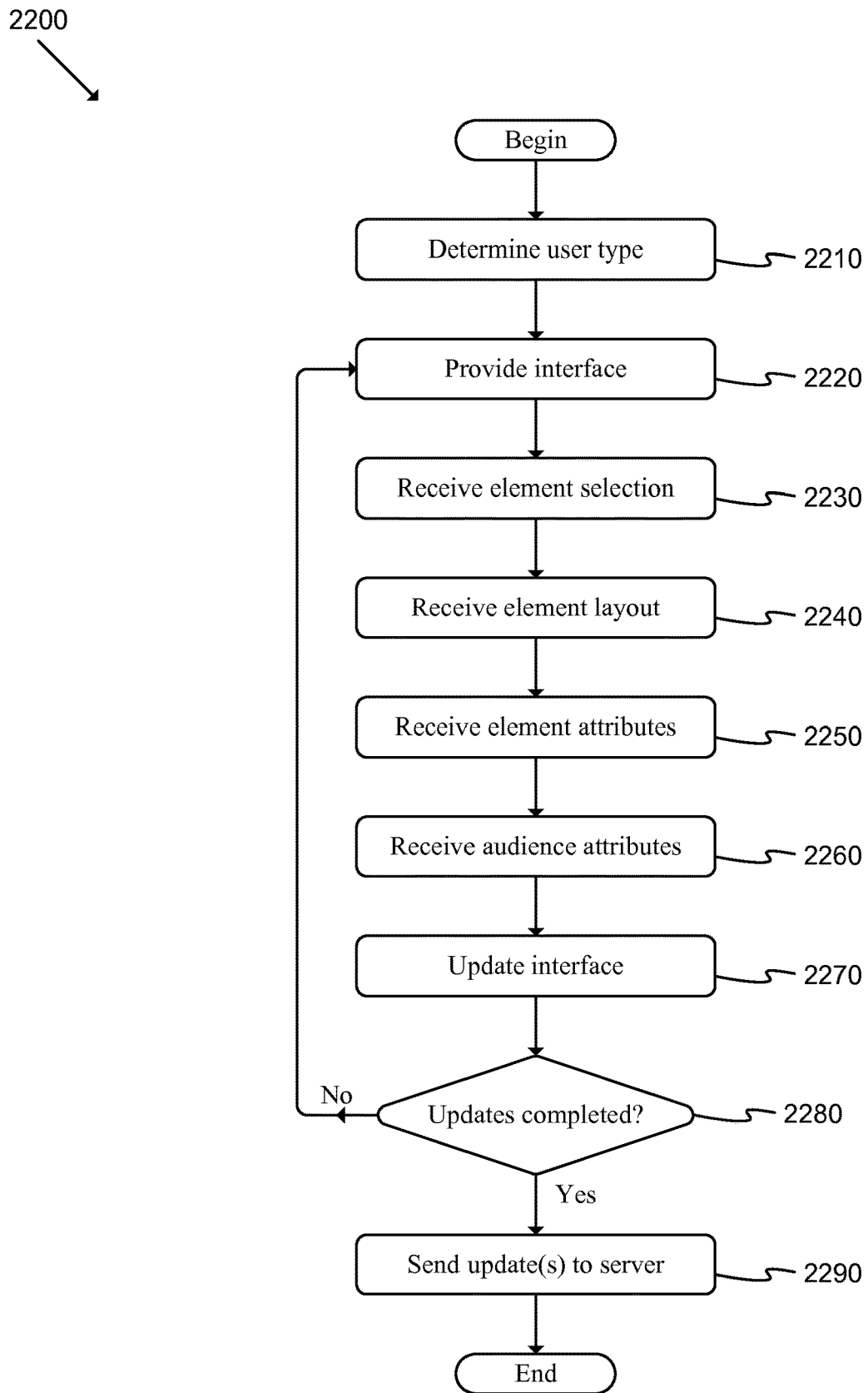
FIG. 22 illustrates a flow chart of an exemplary client-side process that manages interface layout and content.

FIG. 22 illustrates a flow chart of an exemplary client-side process 2200 that manages interface layout and content. Such a process may be executed by a device such as user device 240 and/or by elements of client application 305 or 355. The process may begin, for instance, after an authentication is received (such as via process 1600) and/or after content is generated (such as using process 2000).

As shown, the process may determine (at 2210) a user type (e.g., administrator, teacher, parent, etc.) and provide (at 2220) the appropriate user interface or dashboard. Next, the process may receive (at 2230) an element selection. Such a selection may be made in various appropriate ways (e.g., a user may select an element from a list of available elements, a user may create a new element, etc.). In this discussion, an element may refer to a content element, a dashboard element (e.g., a button, tab, icon, etc.), a dashboard layout element (e.g., row, column, etc.), and/or other appropriate elements.

Next, the process may receive (at 2240) an element layout. Such a layout may include a placement within the dashboard and/or layout attributes such as size, expansion, etc. Different embodiments may allow different layout options. For instance, some embodiments may allow a dashboard to include sets of columns and each element may be associated with a column. Such columns may span the entire dashboard or a portion thereof. The columns may be evenly spaced or have differing widths.

The process may then receive (at 2250) element attributes. Such attributes may include, for instance, data source, content placement or format, etc. Next, the process may receive (at 2260) audience attributes. Such attributes may include, for instance, a listing of users (or types of users), privileges associated with each user (and/or user type), customizations (e.g., additional filtering to be performed for some types of users), etc.

The process may then update (at 2270) the interface layout and content. The process may then determine (at 2280) whether the updates have been completed. Such a determination may be made based on various relevant factors (e.g., user selection, user privilege, etc.). If the process determines (at 2280) that not all updates have been completed, the process may repeat operations 2220-2280 until the process determines (at 2280) that all updates have been completed.

If the process determines (at 2280) that all updates have been completed, the process may then send (at 2290) the updates to a server application and then end.

Figure 23:
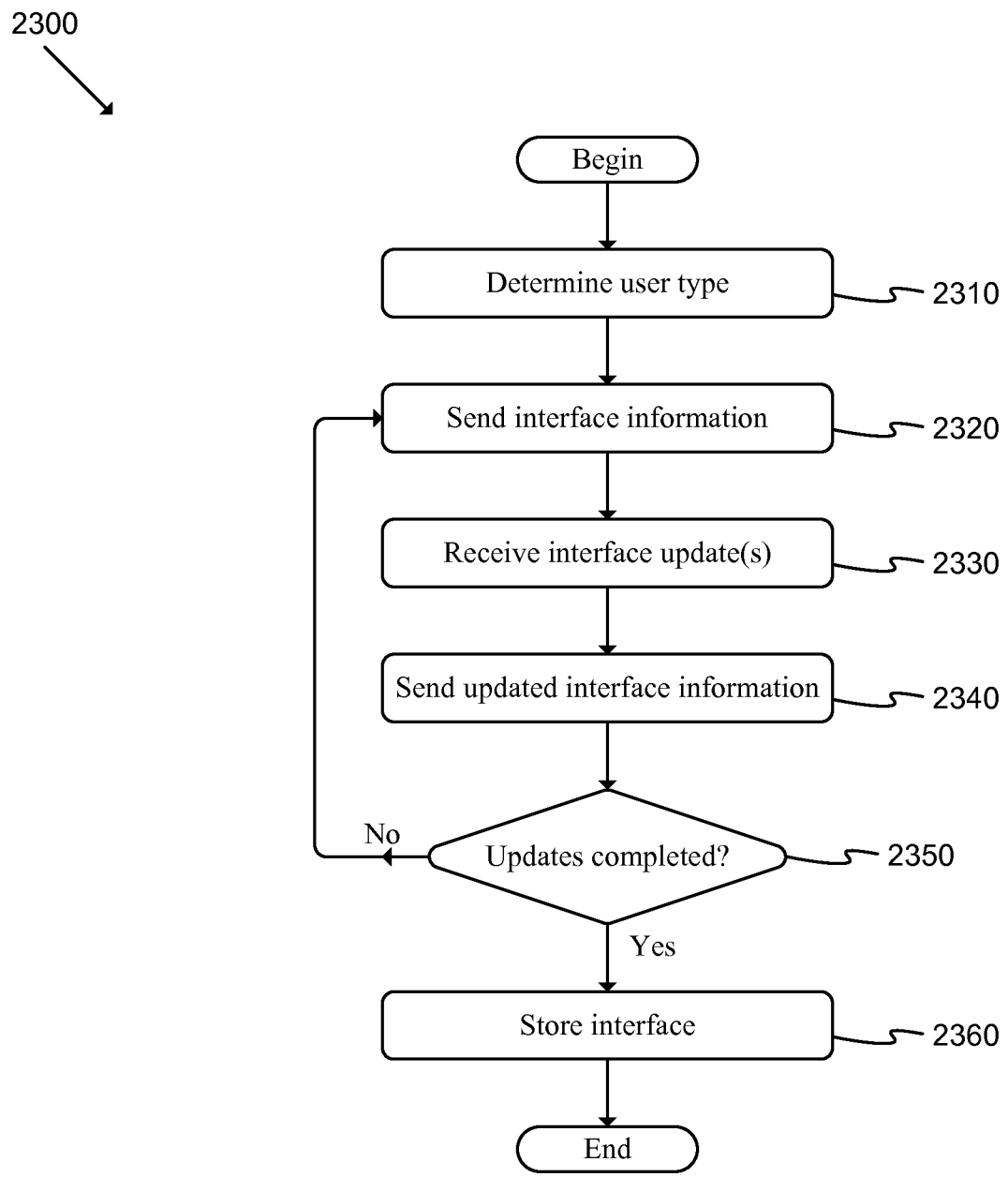
FIG. 23 illustrates a flow chart of an exemplary server-side process that manages interface layout and content.

FIG. 23 illustrates a flow chart of an exemplary server-side process 2300 that manages interface layout and content. Such a process may be executed by a device such as server 210 and/or by elements of application 315 and/or API 320. The process may be executed as a complement to process 2200. The process may begin, for instance, after an authentication is provided (such as via process 1700) and/or after content is generated (such as using process 2100).

As shown, process 2300 may determine (at 2310) a user type. Such a determination may be made based on authentication data received from the user. Next, the process may send (at 2320) interface information to the client application. The process may then receive (at 2330) updates to the interface. Such updates may be received from a client application and may include updates to content elements, layout, GUI elements, etc.

Next, the process may send (at 2340) updated interface information. Such updated information may be based at least partly on the received updates. The updated interface information may include GUI elements (and/or associated layout, configuration, etc.), content elements (and/or associated attributes), etc.

The process may then determine (at 2350) whether all updates have been completed. Such a determination may be made at least partly based on information received from the client. If the process determines that there are additional updates, the process may repeat operations 2320-2350 until the process determines (at 2350) that all updates have been completed.

The process may then store (at 2360) the updated interface and then may end. The updated interface may then be available for use by the various users associated with the interface.

E. User Session

Figure 24:
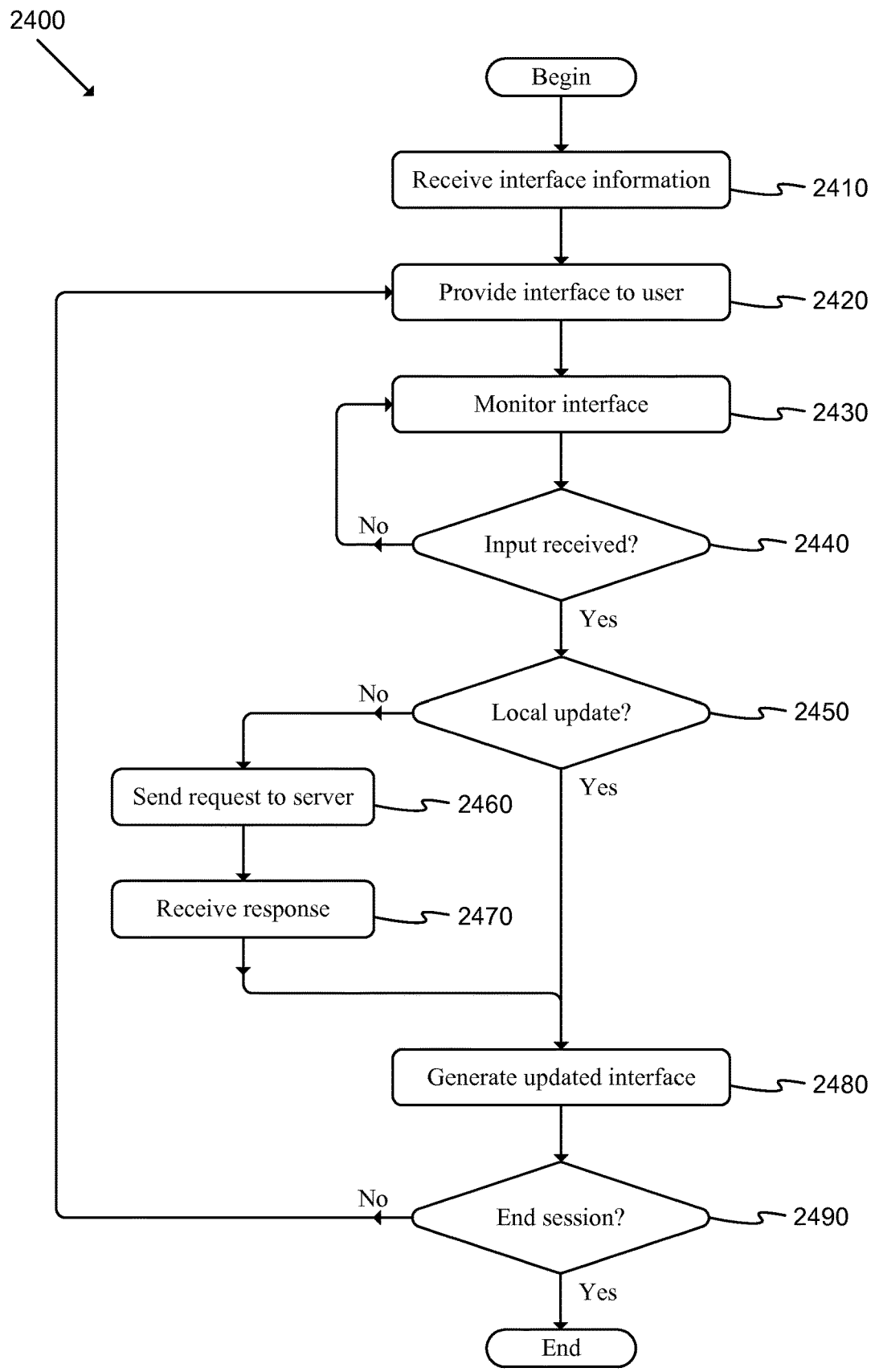
FIG. 24 illustrates a flow chart of an exemplary client-side process that provides a user session.

FIG. 24 illustrates a flow chart of an exemplary client-side process 2400 that provides a user session. Such a process may be executed by a device such as user device 240 and/or by elements of client application 305 or 355. The process may begin, for instance, after an authentication is received (such as via process 1600).

As shown, the process may receive (at 2410) interface information from a server. The process may then provide (at 2420) the interface to a user. Such an interface may be similar to GUI 400 or 500. The process may then monitor (at 2430) the interface and determine (at 2440) whether an input is received.

The process may repeat operations 2430-2440 until the process determines (at 2440) that an input has been received. The process may then determine (at 2450) whether a local update is required. Such a local update may include, for instance, updates to fonts, colors, etc. Another example of a local update is expansion or contraction of a content element.

If the process determines (at 2450) that a remote update is needed, the process may send (at 2460) a request to a server and receive (at 2470) a response. Examples of remote updates include requests for refreshed data from external sources, requests for forms or lists stored at the server, etc. The request may include a content element identifier, request parameters, and/or other relevant information. The response may include updated data, display parameters, and/or other appropriate elements that may be used to update the interface.

The process may, after determining (at 2450) that a local update is needed or after receiving (at 2470) the response, generate (at 2480) an updated interface and provide the updated interface to the user.

The process may then determine (at 2490) whether to end the session. Such a determination may be made based on various relevant factors (e.g., user selection, elapsed time since last update request, etc.). If the process determines that the session should not be ended, the process may repeat operations 2410-2490 until the process determines (at 2490) that the session should end and then the process may end.

Figure 25:
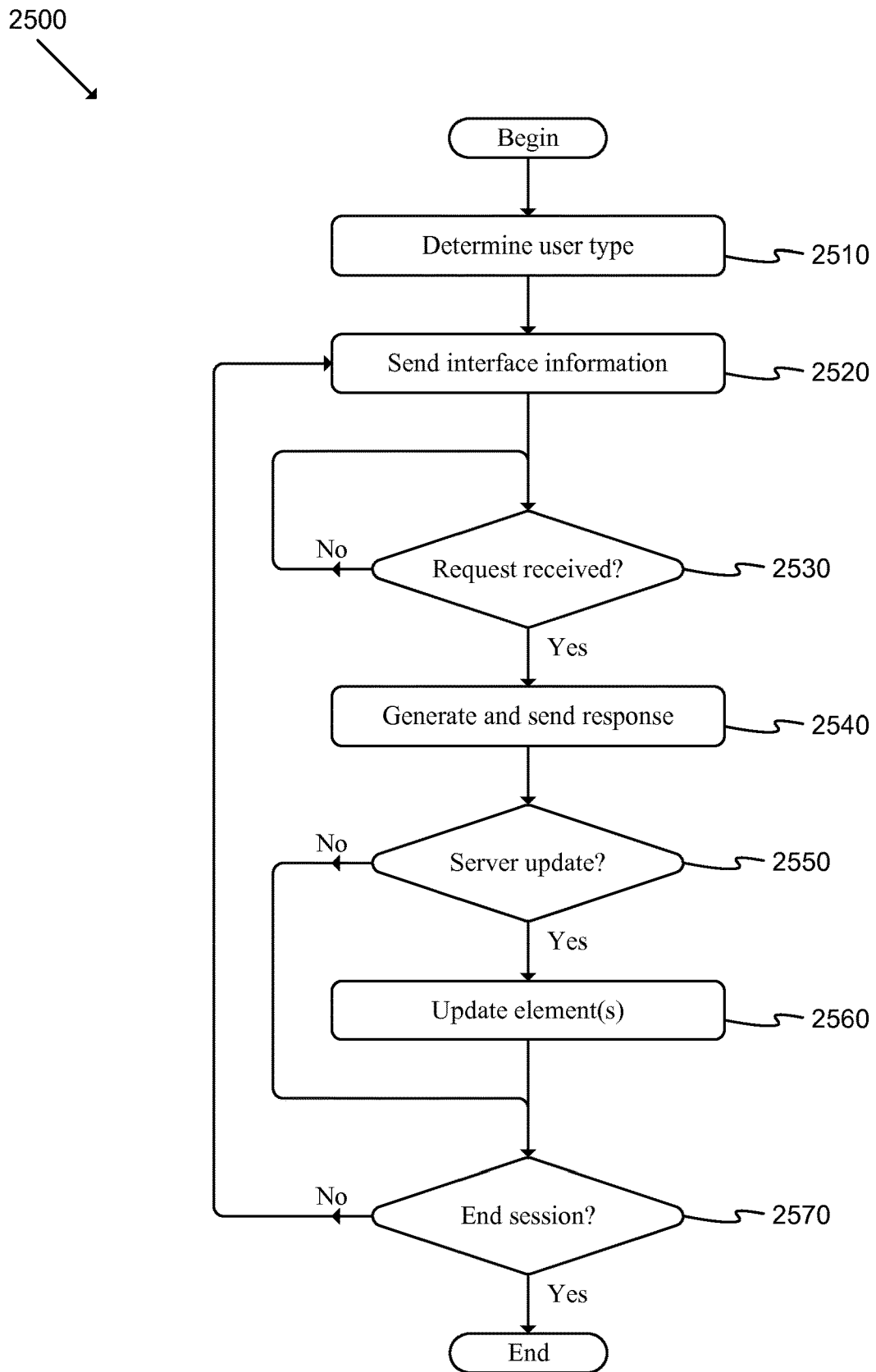
FIG. 25 illustrates a flow chart of an exemplary server-side process that provides a user session.

FIG. 25 illustrates a flow chart of an exemplary server-side process 2500 that provides a user session. Such a process may be executed by a device such as server 210 and/or by elements of application 315 and/or API 320. The process may be executed as a complement to process 2400. The process may begin, for instance, after an authentication is provided (such as via process 1700).

As shown, process 2500 may determine (at 2510) a user type. Such a determination may be made based on authentication data received from the user. Next, the process may send (at 2520) interface information to the client application.

The process may then determine (at 2530) whether a request has been received. Such a request may be sent from a client as described above. If the process determines that no request has been received, the process may iteratively repeat operation 2530 until the process determines that a request was received.

Next, the process may generate and send (at 2540) a response. Such a response may include updated interface elements (e.g., graphical interface changes, addition or update of content elements, etc.). The response may be generated by retrieving updated data in some cases. For instance, a user may select a tab associated with a new and different page than currently being viewed. The new page may include reports or other content that may require data to be retrieved from appropriate sources.

The process may then determine (at 2550) whether a server update is needed based on the received request. For instance, if a user updates a report or other content item that is available to other users, such an update may be applied by the server such that the other users will also receive the updated content at their next system interaction. If the process determines that a server update is needed, the process may update (at 2560) the affected elements.

After updating (at 2560) the elements or after determining (at 2550) that no server update is needed, the process may determine (at 2570) whether the session has ended. Such a determination may be made based on various relevant criteria (e.g., a user logs off the system, an elapsed time threshold since the last user interaction, etc.). If the process determines that the session has not ended, the process may repeat operations 2520-2570 until the process determines (at 2570) that the session has ended and then the process may end.

F. Report Generation

Figure 26:
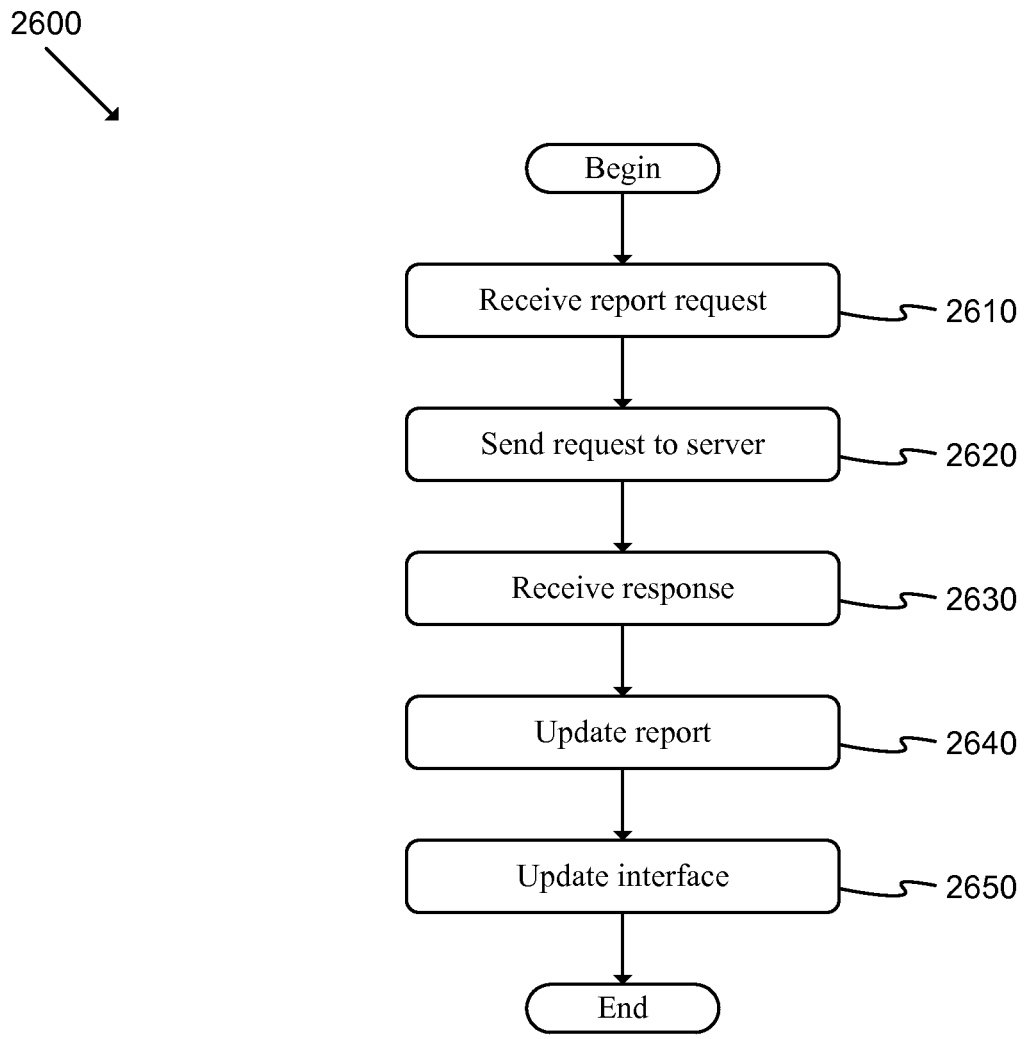
FIG. 26 illustrates a flow chart of an exemplary client-side process that generates a report.

FIG. 26 illustrates a flow chart of an exemplary client-side process 2600 that generates a report. Although the following discussion relates to "reports" similar processes may be used to generate or update other content elements (e.g., tables, graphs, forms, etc.). Such a process may be executed by a device such as user device 240 and/or by elements of client application 305 or 355. The process may begin, for instance, when an interface is presented to a user or when a portlet refresh request is identified.

As shown, the process may receive (at 2610) a report request. Such a request may be received via a GUI of some embodiments. For instance, a user may open a previously closed content element that includes a report (or other data collected from external sources), a user may select a refresh icon on a portlet that includes a report, updated filter parameters may be selected or specified by a user, a specified automatic refresh time may be exceeded, etc.

The process may then send (at 2620) a request to the server. Such a request may include, for instance, a report identifier, content parameters, filter parameters, etc. If not previously sent, the request may include user information (e.g., type, access level, etc.).

The process may then receive (at 2630) a response to the request. The response may include updated report data, graphical elements, multimedia content, and/or other appropriate elements. Next, the process may update (at 2640) the report based on the received response.

Process 2600 may then update (at 2650) the interface that is presented to the user based on the updated report and then may end.

Figure 27:
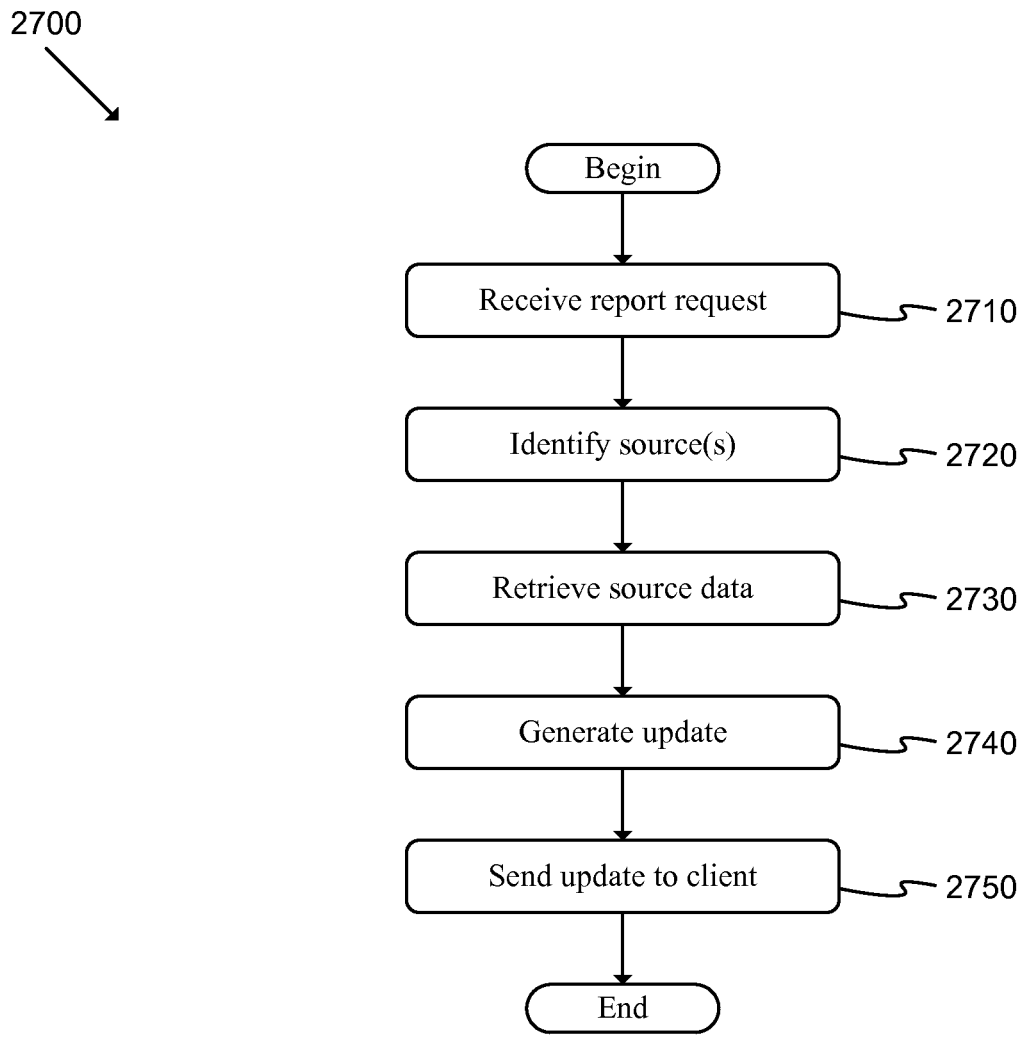
FIG. 27 illustrates a flow chart of an exemplary server-side process that generates a report.

FIG. 27 illustrates a flow chart of an exemplary server-side process 2700 that generates a report. Such a process may be executed by a device such as server 210 and/or by elements of application 315 and/or API 320. The process may be executed as a complement to process 2600. The process may begin, for instance, when interface information is sent to a client or when a refresh request is received at the server.

As shown, the process may receive (at 2710) a report request. The process may then identify (at 2720) the data sources associated with the report. The sources may include local storages associated with the server (and/or other local resources) and/or network-connected resources such as third-party servers, APIs, or storages.

Next, the process may retrieve (at 2730) data from the source(s). The process may then generate (at 2740) an update and send (at 2750) the update to the client and then may end. The update may include new or additional information related to the report, new or updated graphical representations, and/or other appropriate information. In some cases, a request from a first user may case updates to be sent to multiple other users (e.g., when an administrator requests an updated report, the update may be distributed to all users currently accessing the report).

One of ordinary skill in the art will recognize that processes 1600-2700 may be implemented in various different ways in different embodiments. For instance, different embodiments may include additional operations, omit operations, and/or perform operations in a different order than described above. As another example, various processes or portions thereof may be performed iteratively, periodically, and/or based on some criteria. Furthermore, each process may be divided into a set of sub-processes or included as part of a macro process.

In addition, many of the operations described above may be performed (or allowed) based on user type. For instance, an administrator may have more available options than a parent-user. As another example, changes made by some user types may cause updates to be distributed to other user types. In contrast, changes by some user types may only affect those users themselves and may not be distributed or available to other users. In some embodiments certain user types (e.g., administrators) may be able to set privileges for other users to update content (and/or content access).

IV. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be adapted to perform functions and/or features that may be associated with various software elements described throughout.

Figure 28:
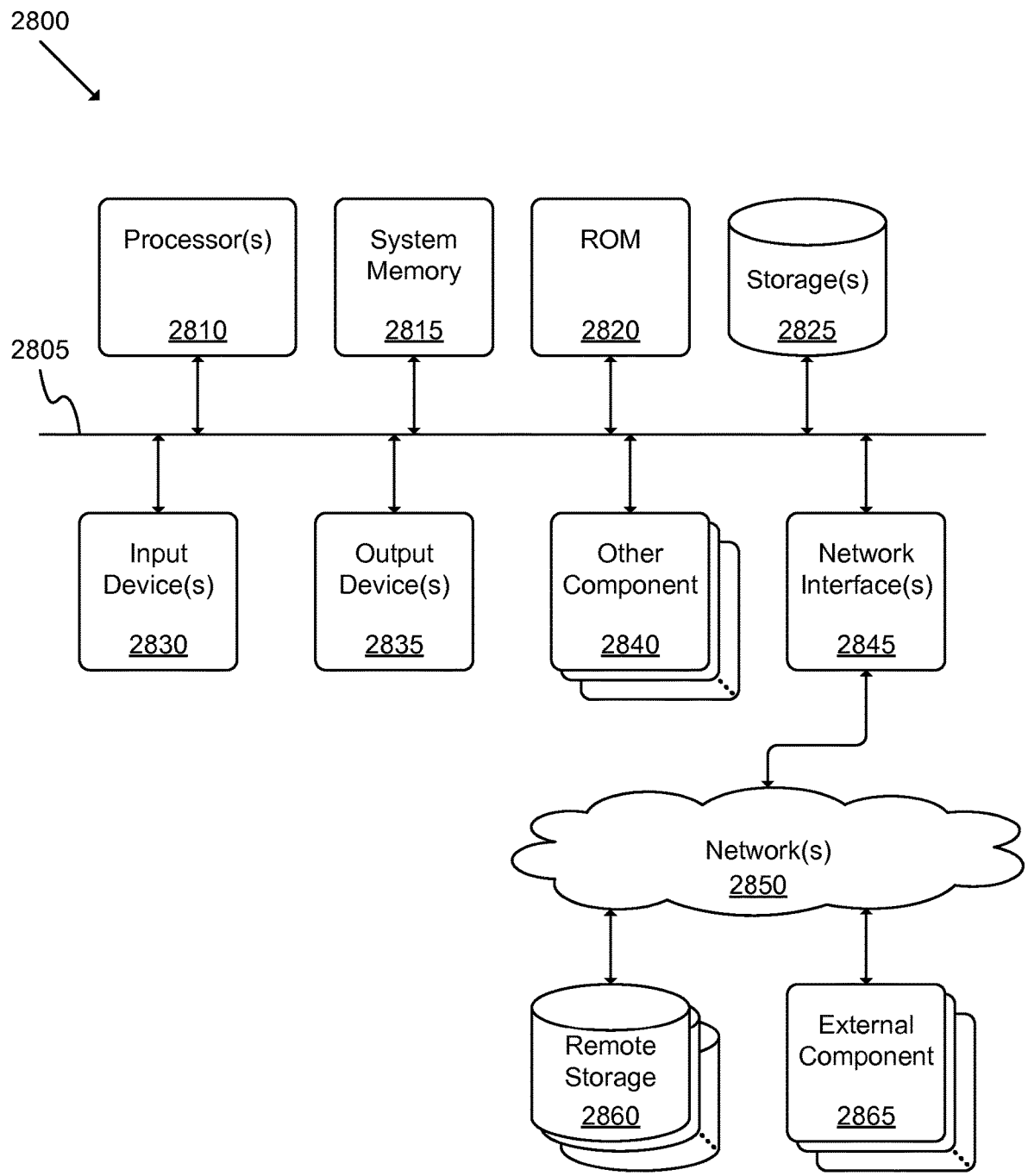
FIG. 28 illustrates a schematic block diagram of an exemplary computer system used to implement some embodiments.

FIG. 28 illustrates a schematic block diagram of an exemplary computer system 2800 used to implement some embodiments. For example, the system described above in reference to FIGS. 1-3 may be at least partially implemented using computer system 2800. As another example, the processes described in reference to FIGS. 16-27 may be at least partially implemented using sets of instructions that are executed using computer system 2800.

Computer system 2800 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 2800 may include at least one communication bus 2805, one or more processors 2810, a system memory 2815, a read-only memory (ROM) 2820, permanent storage devices 2825, input devices 2830, output devices 2835, various other components 2840 (e.g., a graphics processing unit), and one or more network interfaces 2845.

Bus 2805 represents all communication pathways among the elements of computer system 2800. Such pathways may include wired, wireless, optical, and/or other appropriate communication pathways. For example, input devices 2830 and/or output devices 2835 may be coupled to the system 2800 using a wireless connection protocol or system.

The processor 2810 may, in order to execute the processes of some embodiments, retrieve instructions to execute and/or data to process from components such as system memory 2815, ROM 2820, and permanent storage device 2825. Such instructions and data may be passed over bus 2805.

System memory 2815 may be a volatile read-and-write memory, such as a random access memory (RAM). The system memory may store some of the instructions and data that the processor uses at runtime. The sets of instructions and/or data used to implement some embodiments may be stored in the system memory 2815, the permanent storage device 2825, and/or the read-only memory 2820. ROM 2820 may store static data and instructions that may be used by processor 2810 and/or other elements of the computer system.

Permanent storage device 2825 may be a read-and-write memory device. The permanent storage device may be a non-volatile memory unit that stores instructions and data even when computer system 2800 is off or unpowered. Computer system 2800 may use a removable storage device and/or a remote storage device as the permanent storage device.

Input devices 2830 may enable a user to communicate information to the computer system and/or manipulate various operations of the system. The input devices may include keyboards, cursor control devices, audio input devices and/or video input devices. Output devices 2835 may include printers, displays, and/or audio devices. Some or all of the input and/or output devices may be wirelessly or optically connected to the computer system.

Other components 2840 may perform various other functions. These functions may include performing specific functions (e.g., graphics processing, sound processing, etc.), providing storage, interfacing with external systems or components, etc.

Finally, as shown in FIG. 28, computer system 2800 may be coupled to one or more networks 2850 through one or more network interfaces 2845. For example, computer system 2800 may be coupled to a web server on the Internet such that a web browser executing on computer system 2800 may interact with the web server as a user interacts with an interface that operates in the web browser. Computer system 2800 may be able to access one or more remote storages 2860 and one or more external components 2865 through the network interface 2845 and network 2850. The network interface(s) 2845 may include one or more APIs that may allow the computer system 2800 to access remote systems and/or storages and also may allow remote systems and/or storages to access computer system 2800 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2800 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the spirit and scope of the disclosure as defined by the following claims.

I claim:

1. An automated method of providing customizable controlled-access to child care planning resources, the method comprising:
    at a first client device, authenticating a first user;
    at the first client device, determining a user type associated with the first user, the user type comprising one of a teacher-user, a social-worker-user, and a parent-user;
    displaying, on a graphical user interface (GUI) on a display of the first client device, a first set of content elements based at least partly on the user type;
    receiving, from the GUI of the first client device, a selection of a content element in the first set of content elements, the selected content element comprising data associated with a child;
    receiving, from the GUI of the first client device, a selection of a layout identifying a placement of said content element within the GUI;
    receiving, from the GUI of the first client device, a set of user-defined display formatting attributes for displaying said content element;
    receiving, from the GUI of the first client device, a set of audience attributes associated with said content element, the set of audience attributes comprising a listing of user types comprising one of a teacher-user, a social-worker-user, and a parent-user, privileges associated with each user type, and customization to be performed for each user type;
    sending the user type, said content element, the selected layout, the set of user-defined display formatting attributes, and the set of audience attributes from the first client device to a server;
    at a second client device, authenticating a second user;
    at the second client device, determining a user type associated with the second user, the user type associated with the second user comprising one of a teacher-user, a social-worker-user, and a parent-user;
    displaying, on a GUI on a display of the second client device, a second set of content elements comprising said content element based at least partly on the user type associated with the second user;
    receiving a selection of said content element from the GUI of the second client device;
    sending an update request associated with said content from the second client device to the server;
    receiving, at the second client device, from the server, data associated with the update request to change a layout of the GUI of the second client device; and
    at the second client device, changing the layout of the GUI of the second client to display the selected content element based on the user type associated with the second user, the received data to change the layout, the set of user-defined display formatting attributes associated with said content element, and the set of audience attributes associated with said content element.

2. The automated method of claim 1 further comprising:
    retrieving a first set of GUI attributes associated with the user type associated with the second user;
    retrieving a second set of GUI attributes associated with the user type associated with the second user; and
    applying the first and second sets of GUI attributes to the GUI of the second client device, wherein the first set of GUI attributes comprises a specified privilege and the second set of GUI attributes comprises a set of data filter parameters.

3. The automated method of claim 1 further comprising retrieving content associated with each content element in the first set of content elements from one of an internal source and an external source.

4. The automated method of claim 1, each content element comprising at least one input element and at least one content item,
    wherein an inclusion of the at least one input element and an inclusion of the at least one content item in each content element is based at least partly on a user identity associated with the first user, wherein the at least one input element and the at least one content item are identified based on previous administrator selections related to a user type associated with the user identity, and the first set of content elements include a set of end user customizable display attributes that are applied to future sessions associated with the user identity.

5. The automated method of claim 4, wherein the user identity comprises at least one of a user type, a group association, a permission level, and a role.

6. The automated method of claim 4, wherein the at least one content item includes at least one of a report, a graph, a table, a form, a reminder, and a multimedia content.

7. The automated method of claim 1 further comprising displaying a set of input elements in the GUI of the first client device, wherein the set of input elements includes at least one of a button, a tab, a menu, and an icon, wherein inclusion of elements in the set of the input elements is based at least partly on an identity of the first user.

8. The automated method of claim 7, wherein the set of input elements is a first set of input elements, and wherein at least one input element in the set of input elements includes a link to a different GUI dashboard comprising a second set of input elements and a second third set of content elements.

9. The automated method of claim 1 further comprising:
    displaying a set of input elements in the GUI of the first client device; and
    selecting and configuring the set of input elements and the first set of content elements based on inputs received from the first user.

10. The automated method of claim 9 further comprising:
    configuring at least a portion of the set of input elements and at least a portion of the set of content elements based on inputs received from a user different than the first user, and designating the portion of the set of input elements and the portion of the set of content elements based on inputs received from the first user.

11. The automated method of claim 1, further comprising:
at the first client device, retrieving data from a plurality of data sources related to child care planning via at least one network;
processing the retrieved data; and
displaying, on the GUI of the first client device, the processed data based on the user-defined display formatting attributes.

12. The automated method of claim 11 further comprising:
providing configuration data to generate a plurality of user interfaces (UIs) in the GUI of the first client device based at least partly on the retrieved and processed data, wherein each UI in the plurality of UIs is associated with a user attribute.

13. The automated method of claim 12, wherein the user attribute comprises at least one of a type and a permission level, and wherein the configuration data comprises data associated with a particular user.

14. The automated method of claim 1, wherein the first set of content elements further comprises data associated with one of a family and a staff, the method further comprising:
receiving a selection of a content element comprising data associated with one of the family and the staff in the first set of content elements;
receiving a layout comprising the user-defined display formatting from the server based at least partly on the user type and the selected content element; and
based on the layout received from the server, changing the layout of the user interface on the display of the first client device to display the selected content element.

15. The automated method of claim 1 further comprising:
identifying a dashboard associated with the first user;
retrieving a set of portlets associated with the dashboard;
retrieving a set of preferences specified by the first user; and
updating the GUI on the display of the first client device based at least partly on the dashboard, the set of portlets, and the set of preferences.

16. The automated method of claim 15, wherein each portlet from the set of portlets comprises:
a set of input elements; and
a content element.

17. The automated method of claim 16, wherein each portlet from the set of portlets is associated with a layout within the GUI of the first client device.

* * * * *